(12) United States Patent  (10) Patent No.: US 7,333,989 B1
Sameshima et al.  (45) Date of Patent: Feb. 19, 2008

(54) METHOD AND APPARATUS FOR INTEGRATING DISTRIBUTED INFORMATION

(75) Inventors: Shigetoshi Sameshima, Kawasaki (JP); Katsumi Kawano, Kawasaki (JP); Hiroshi Wataya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/459,342

(22) Filed: Dec. 13, 1999

Related U.S. Application Data

(63) Continuation of application No. 09/048,989, filed on Mar. 27, 1998, now Pat. No. 6,038,564.

(30) Foreign Application Priority Data

Mar. 27, 1997  (JP)  .................... 9-075529

(51) Int. Cl.
*G06F 7/00* (2006.01)
*G06F 12/00* (2006.01)
(52) U.S. Cl. .......................... 707/10; 707/200
(58) Field of Classification Search ............. 707/1–10, 707/100–104, 200–206, 104.1; 348/12, 14.02; 375/347; 382/209; 713/200; 340/522; 358/525, 400, 441, 442; 709/101, 314, 300, 709/217, 318, 319; 370/10, 13, 15, 16, 111, 370/112, 113, 201–207, 213, 215, 216, 110, 370/230, 277, 282, 299, 300, 371
See application file for complete search history.

(56) References Cited

U.S. PATENT DOCUMENTS 4,729,038 A  3/1988  Miura et al. ................. 358/300

(Continued)

FOREIGN PATENT DOCUMENTS

JP  56111353  10/1981

(Continued)

OTHER PUBLICATIONS

Bernus, P. and Papazoglou, M.P.; "Knowledge Based Architecture to Integrate Heterogeneous Distributed Information Systems"; IEEE; 1990; pp. 682-689.*

(Continued)

*Primary Examiner*—Ella Colbert
(74) *Attorney, Agent, or Firm*—Mattingly, Stanger, Malur & Brundidge, P.C.

(57) ABSTRACT

Distributed information integrating method and apparatus for collecting data requested by a program at a data request side, integrating the collected data and supplying the integrated data to the request-side program irrespective of the existence of a processing device storing the data and a transmission medium. An event linking data table 232 stores the name of data to be collected in response to an occurring event and a transmission destination of the collected data. Filtering processing 222 refers to the event linking data table 232 in response to an event occurring on a self processing device and a message event received through a transmission medium to collect the data stored in the self processing device, and transmits the collected data to a transmission destination. A data integration management table 233 sets the items of data to be integrated while dividing the items for every data name of the collection data. Data integration processing 224 receives collection data from another processing device to integrate the collection data according to the setting of the data integration management table 233, and delivers the integrated data to an application program 212.

10 Claims, 23 Drawing Sheets

U.S. PATENT DOCUMENTS

| | | | | |
|---|---|---|---|---|
| 4,736,255 A | | 4/1988 | Miura et al. | 358/300 |
| 5,061,916 A | * | 10/1991 | French et al. | 375/347 |
| 5,303,235 A | * | 4/1994 | Chan et al. | 370/254 |
| 5,483,658 A | * | 1/1996 | Grube et al. | 713/200 |
| 5,497,318 A | | 3/1996 | Miyagawa et al. | 705/12 |
| 5,655,079 A | * | 8/1997 | Hirasawa et al. | 709/245 |
| 5,732,222 A | | 3/1998 | Miyagawa et al. | 705/12 |
| 5,740,369 A | * | 4/1998 | Yokozawa et al. | 709/217 |
| 5,745,532 A | * | 4/1998 | Campana | 375/347 |
| 5,901,246 A | * | 5/1999 | Hoffberg et al. | 382/209 |
| 5,917,912 A | | 6/1999 | Ginter et al. | 380/24 |
| 5,953,046 A | * | 9/1999 | Pocock | 348/12 |
| 6,009,284 A | * | 12/1999 | Weinberger et al. | 399/8 |
| 6,016,334 A | * | 1/2000 | Kasrai | 379/15 |

FOREIGN PATENT DOCUMENTS

JP    6331752    12/1994

OTHER PUBLICATIONS

Mastering Middle Ware, RDB+ Windows, Jun. 1994.

* cited by examiner

FIG.3B (iii) OUTPUT OPTION

| TIME-OUT | DATA RECEPTION/ DELIVERY METHOD | AND/OR JUDGMENT | DATA REQUEST SIDE |
|---|---|---|---|
| 372 | 373 | 374 | 375 |
|  |  |  |  |

(iv) STATUS MANAGEMENT TABLE

| EVENT IDENTIFIER | BUFFER INDEX | FIRST EVENT ARRIVAL TIME | COLLECTION JUDGMENT MAP |
|---|---|---|---|
| 391 | 392 | 393 | 394 |
|  |  |  |  |
|  |  |  |  |
|  |  |  |  |
| ⋮ |  |  |  |
|  |  |  |  |

FIG.5

232 : EVENT LINKING DATA TABLE

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| | | | | | | |
| | | | | | | |
| | | | | | | |
| | | | | | | |
| | | | | | ... | |

451 / 452 / 453 / 454 / 455 / 456

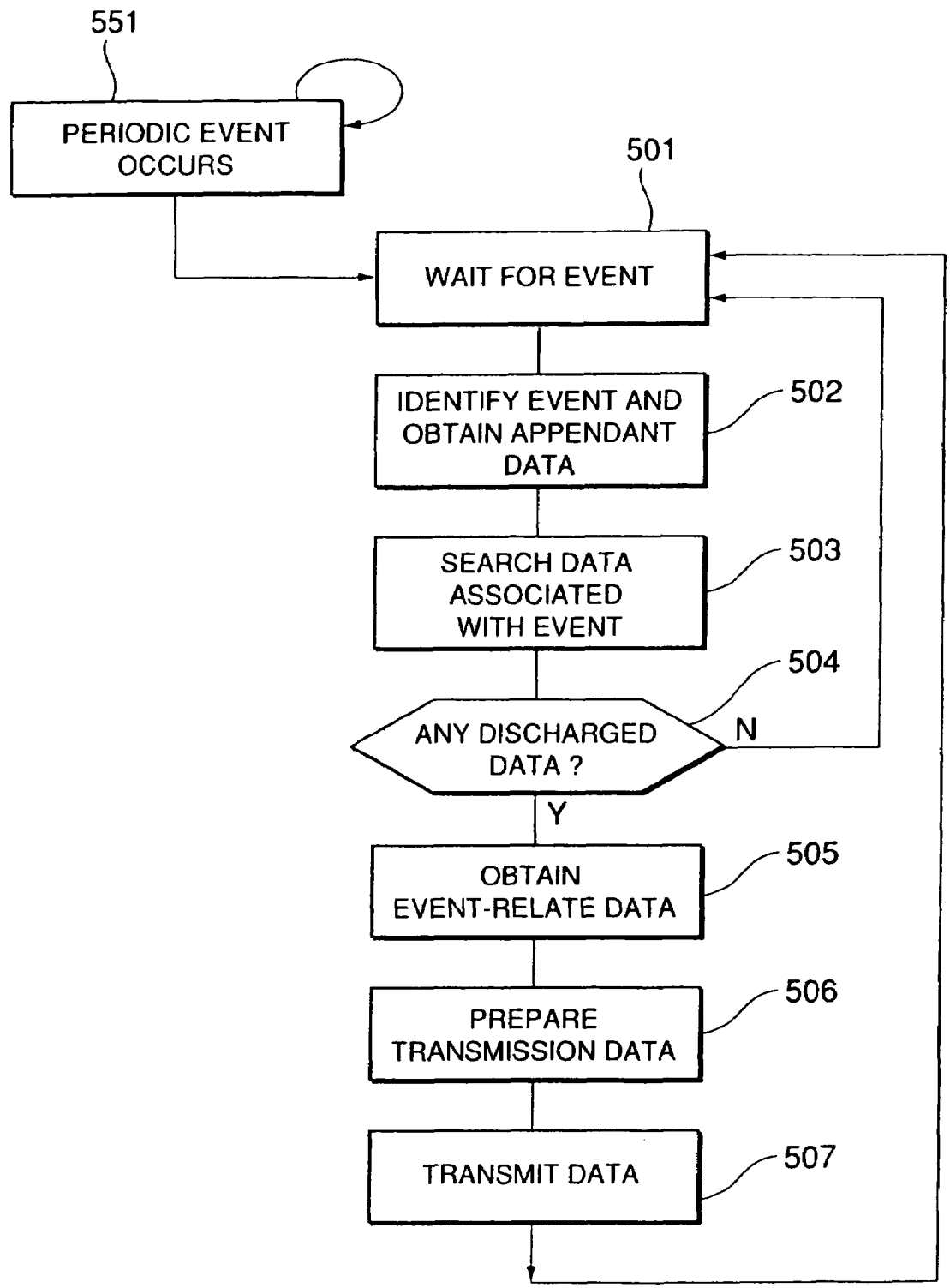

FIG.8B
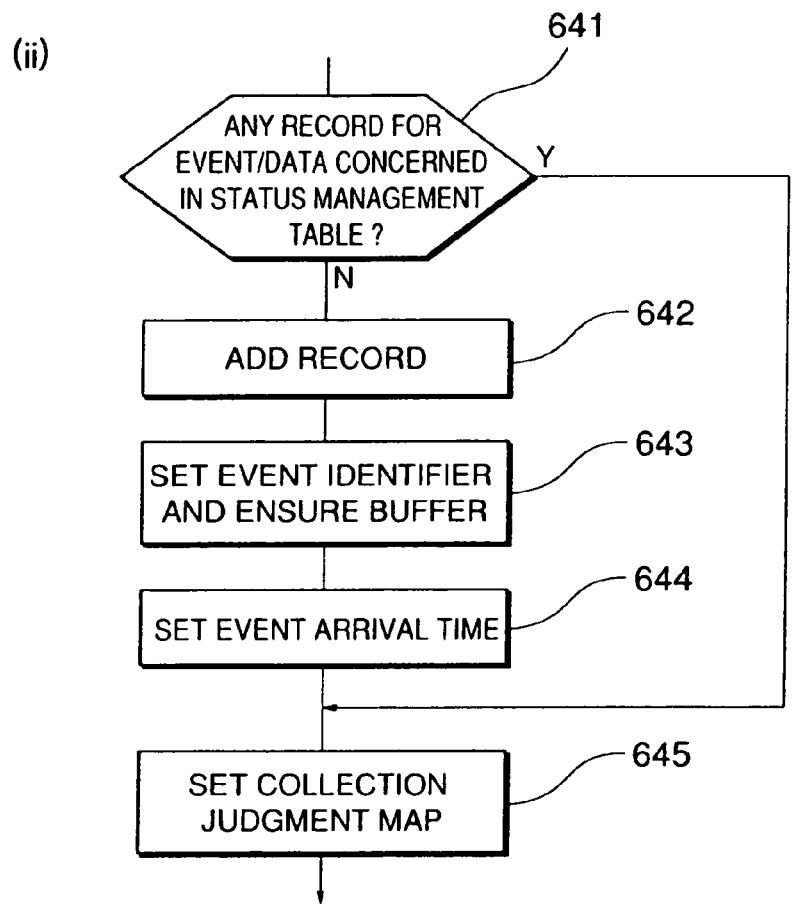
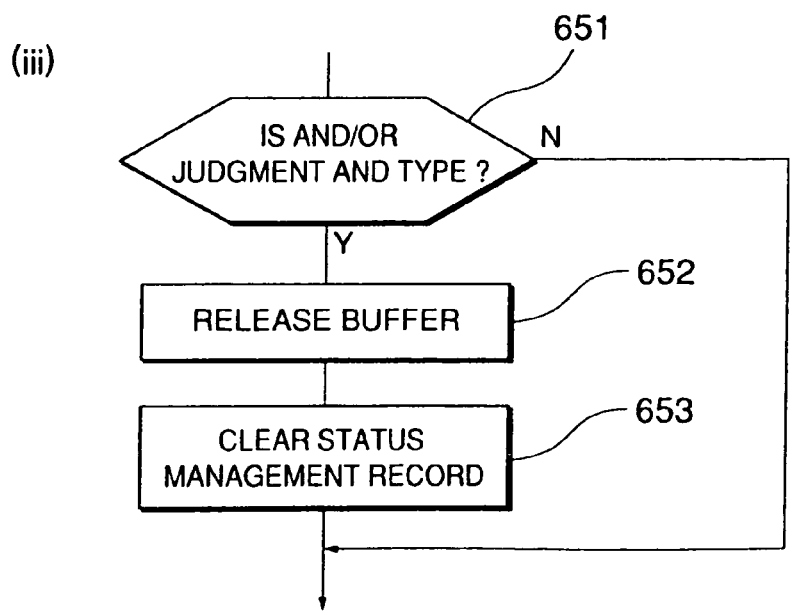

FIG.9

234 STATUS CONTROL TABLE

| EVENT | | START/END | CONDITION FREQUENCY | EVENT COUNTER | CONTROL TARGET | CONTROL TARGET INDEX |
|---|---|---|---|---|---|---|
| TYPE | CONDITION | | | | | |
| | | | | | | |
| | | | | | | |
| | | | | | | |
| | | | | ... | | |
| | | | | | | |

1611 — EVENT (TYPE/CONDITION)
1612 — START/END
1613 — CONDITION FREQUENCY
1614 — EVENT COUNTER
1615 — CONTROL TARGET
1616 — CONTROL TARGET INDEX

FIG.12A (i)

| PART ID | Lot No. | QUALITY REFERENCE VALUE | PRE-PROCESSING RESULT VALUE |
|---|---|---|---|

712

(ii)

821

| PART ID | QUALITY REFERENCE VALUE | CONDITION VALUE 1 | CONDITION VALUE 2 | RENEWAL TIME |
|---|---|---|---|---|
|  |  |  |  |  |
|  |  |  |  |  |
|  |  |  |  |  |
|  |  |  |  |  |
| ⋮ |  |  |  |  |
|  |  |  |  |  |

(iii)

822

| Lot No. | Lot TRACK RECORD | RENEWAL TIME |
|---|---|---|
| 916 |  |  |
| 917 |  |  |
| 918 |  |  |
| ⋮ |  |  |
| 919 |  |  |

FIG. 12B

233: DATA INTEGRATION MANAGEMENT TABLE
301: BASKET SETTING TABLE (iv)

| BASKET NAME | COLLECTION EVENT | | COLLECTION ITEM TABLE INDEX | OUTPUT OPTION INDEX | STATUS MANAGEMENT TABLE INDEX | ACTIVE STATUS |
|---|---|---|---|---|---|---|
| | TYPE | CONDITION | | | | |
| PRODUCTION INSTRUCTION | Msg:LINE ACCESS | PART ID>1000 | ● | ● | ● | 1 |
| ... | | | | | | |

921

(v)

| BASKET ITEM NAME | TYPE (STYLE) | REFERENCE SOURCE | | CONDITION |
|---|---|---|---|---|
| | | SOURCE NAME | DATA ITEM NAME | |
| PART ID | long | Msg: LINE ACCESS | PART ID | |
| Lot No. | long | Msg: LINE ACCESS | Lot No. | |
| PROCESSING CONDITION VALUE 1 | short | S2: MANUFACTURING CONDITION | CONDITION VALUE 1 | MANUFACTURING CONDITION, PART ID = LINE ACCESS, PART ID |
| PROCESSING CONDITION VALUE 2 | char(6) | S2: MANUFACTURING CONDITION | CONDITION VALUE 2 | "MANUFACTURING CONDITION, PART ID = LINE ACCESS, PART ID" & "MANUFACTURING CONDITION, QUALITY REFERENCE >= LINE ACCESS, EQUALITY REFERENCE VALUE" |
| PRODUCTION TRACK RECORD | long | S3:MANUFACTURING TRACK RECORD | Lot TRACK PART | MANUFACTURING TRACK RECORD Lot No.= LINE ACCESS Lot No. |

941
942
943
944
945

FIG.12C (vi) 232: EVENT LINKING DATA TABLE

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| Msg: LINE ACCESS | PART ID>1000 | S1 | MANUFACTURING CONDITION | CONDITION VALUE 1 | MANUFACTURING CONDITION, PART ID=LINE ACCESS, PART ID | 1 |
| Msg: LINE ACCESS | PART ID>1000 | S1 | MANUFACTURING CONDITION | CONDITION VALUE 2 | "MANUFACTURING CONDITION, PART ID=LINE ACCESS, PART ID" & "MANUFACTURING CONDITION, QUALITY REFERENCE >=LINE ACCESS, QUALITY REFERENCE VALUE" | 1 |
| ... | | | | | | |

951 — row 1; 952 — row 2

(vii) 232: EVENT LINKING DATA TABLE

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| Msg: LINE ACCESS | PART ID>1000 | S1 | MANUFACTURING TRACK RECORD | Lot TRACK RECORD VALUE | MANUFACTURING TRACK RECORD, Lot No. = LINE ACCESS, Lot No. | 1 |
| ... | | | | | | |

233:DATA INTEGRATION MANAGEMENT TABLE

301:BASKET SETTING TABLE

| BASKET NAME | COLLECTION EVENT | | COLLECTION ITEM TABLE INDEX | OUTPUT OPTION INDEX | STATUS MANAGEMENT TABLE INDEX | ACTIVE STATUS |
|---|---|---|---|---|---|---|
| | TYPE | CONDITION | | | | |
| 1211 ADVANCE | Upd:S3:MANUFACTURING TRACK RECORD | Lot TRACK RECORD VALUE | ● | | | 1 |
| | | | | | | |

| BASKET ITEM NAME | TYPE (STYLE) | REFERENCE SOURCE | | CONDITION |
|---|---|---|---|---|
| | | SOURCE NAME | DATA ITEM NAME | |
| 1231 Lot No. | long | S3: MANUFACTURING TRACK RECORD | Lot No. | |
| 1232 PRODUCTION TRACK RECORD VALUE | long | S3:MANUFACTURING TRACK RECORD | Lot TRACK RECORD VALUE | |
| 1233 PRODUCTION PLAN QUANTITY | long | S4: MANUFACTURING PLAN | PLAN QUANTITY | MANUFACTURING TRACK RECORD. Lot No.= MANUFACTURING PLAN Lot. No. |

FIG.15B

232:EVENT LINKING DATA TABLE

1241

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| Upd:MANUFACTURING TRACK RECORD | Lot TRACK RECORD VALUE | S1,S4 | MANUFACTURING TRACK RECORD | Lot No | | 1 |
| Upd:MANUFACTURING TRACK RECORD | Lot TRACK RECORD VALUE | S1,S4 | MANUFACTURING TRACK RECORD | Lot TRACK RECORD | | |

232:EVENT LINKING DATA TABLE

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| Upd:S3:MANUFACTURING TRACK RECORD | Lot TRACK RECORD VALUE | S1 | MANUFACTURING PLAN | PLAN QUANTITY | MANUFACTURING TRACK RECORD. Lot No.= MANUFACTURING PLAN. Lot No. | 1 |
| ⋮ | | | | | | |

1251

FIG.17A
233:DATA INTEGRATION MANAGEMENT TABLE
301:BASKET SETTING TABLE

| BASKET NAME | COLLECTION EVENT | | COLLECTION ITEM TABLE INDEX | OUTPUT OPTION INDEX | STATUS MANAGEMENT TABLE INDEX | ACTIVE STATUS |
|---|---|---|---|---|---|---|
| | TYPE | CONDITION | | | | |
| 1411 STATUS MONITOR | | | ● | | | 1 |
| 1412 Net3 STATUS | Upd:S6: STATUS TABLE | | ● | | | 1 |
| ⋮ | | | | | | |

| BASKET ITEM NAME | TYPE (STYLE) | REFERENCE SOURCE | | CONDITION |
|---|---|---|---|---|
| | | SOURCE NAME | DATA ITEM NAME | |
| 1421 N2 STATUS STRUCTURE N2 | | S2: STATUS BASKET | * | |
| 1422 N3 STATUS STRUCTURE N3 | | Net3 STATUS | * | |

| BASKET ITEM NAME | TYPE (STYLE) | REFERENCE SOURCE | | CONDITION |
|---|---|---|---|---|
| | | SOURCE NAME | DATA ITEM NAME | |
| N3 STATUS STRUCTURE N3 | | S6: STATUS TABLE | * | |

1431

FIG.17B
232:EVENT LINKING DATA TABLE

| COLLECTION EVENT | | RESPONSE DESTINATION | DATA NAME | COLLECTION DATA ITEM | COLLECTION CONDITION | ACTIVE STATUS |
|---|---|---|---|---|---|---|
| TYPE | CONDITION | | | | | |
| 1441 Upd: STATUS BASKET | | S1 | STATUS BASKET* | | | 1 |
| ⋮ | | | | | | |

METHOD AND APPARATUS FOR INTEGRATING DISTRIBUTED INFORMATION

This is a continuation of application Ser. No. 09/048,989, filed Mar. 27, 1998 now U.S. Pat. No. 6,038,564.

BACKGROUND OF THE INVENTION

1. Field of the Invention

The present invention relates to a method of collecting/distributing message data or data which are stored in each processing device in a distribution processing system, and particularly to a method and an apparatus for collecting and integrating data which are distributed to and stored in plural processing devices, fabricating the integrated data and then supplying the integrated data to an application program.

2. Description of the Related Art

In a distribution processing system, data which are used by an application program means data which are transmitted as message data or data which are stored in a memory or a disk of the processing device containing the application program (hereinafter referred to as "self processing device") or another processing device. The timing at which the application program starts its processing is set to the time point at which it is notified upon reception of a message from another application program, or the application program itself monitors the time point. That is, according to this system, in response to a request of an application program at a reception side, an application program at a message transmission side collects data requested by the application program at the reception side from a storage medium thereof, arranges data items required by the reception side and then transmits the data items thus arranged while continuing message data, or the application program at the message transmission side periodically transmits a reference message until the application program at the reception side obtains the required data, thereby collecting the required data by using an access method which is varied in accordance with the storage medium of the data.

Further, as a means of extracting and supplying data items requested by an application program, there has been known a data base management system (DBMS) for managing a relational data base (RDB) which is described in "Mastering Middle Ware" of Network Computing (the June issue of 1994) pp. 9-23. This system has a function of specifying a condition to extract the data items required by an application program from a table of RDB in which actual data are stored. According to this method, when an application program requests data, an extraction task of extracting the requested data items is performed, and the extracted data are delivered to the application program. Here, the style of the data to be delivered to the application program is determined by an interface between this system and the application program, and for example it is a text style or an original object style. Therefore, in order to use the extracted data for processing, it is necessary to identify the style of the data returned from the DBMS and to convert the style of the data properly.

The application program obtains data and performs processing on the data at a certain timing. Since requested data are different for every program, this timing and the input data are determined for every program. In accordance with processing performance or capacity, the input data are classified into data which are stored in a memory or a disk, data which are transmitted in a message form, or data of a transfer memory style which has a combination of the above two styles. Here, the transfer memory style is defined as a data style in which a copy of information written into a memory by a user is automatically transferred to another memory for use.

These data comprise plural data items, and the program extracts some of data items from each of plural storage media and integrates the plural data items thus extracted for use. Further, an event serving as a trigger to collect the data occurs in a processing device, in which the program exists (i.e., self processing device), but, it may frequently occur in another processing device.

According to a conventional technique, unless an application program requests data stored in the self processing device (i.e., the processing device having the application program) or another processing device, the data cannot be obtained. Further, when data are distributively stored in plural storage media, only a part of the data can be extracted from each storage medium. Therefore, an application program which transmits a message serving as a start timing for the processing, or an application program which performs the processing must detect/notify the timing and collect/integrate the data. For the notification of the timing, the processing of notifying an event is required to be prepared at the event occurrence side and the processing of receiving the event is required to be prepared at the application program side. Further, the application program is required to detect occurrence of an event by itself through periodic polling or the like. In addition, when the data are collected and integrated, it is necessary for data to be obtained through an access method which is different for every storage medium like a transfer memory or a disk, or for all access to be made to RDB to collect the requested latest data when the occurrence of an event is detected. Alternatively, it is necessary for data to be collected at all times even when some of the data thereof are not necessary, and when some data are needed, the data have to be extracted from the collected data and used. Therefore, the application program must be provided with code for event detection processing and data collection processing in addition to the processing which is originally required by the application program, so that the number of developing steps of the application program is increased.

Further, when the performance of the system is tuned or modified, the arrangement of the application programs is varied, or the data storage medium or the data transmission medium is altered. When the application program itself is modified, data items and events which are necessary are altered. In these cases, 'in the conventional technique it is also necessary for the source code of the application program to be reviewed to correct an event detection portion and a data collecting portion other than the main processing portion. When the program at the event transmission side collects/integrates data, a program which transmits an event to be modified must be reviewed, resulting in an increase of the number of steps for the modification.

Still further, there is a case where relational data are collected in response to occurrence of an event for control data in a control system or a case where relational data are collected when an abnormality occurs. A method of collecting data one after another after detection of an event, although relational data are needed at the time the event occurs, has the problem that it has a low real-time performance for data. Particularly when data are obtained from a remote place through plural transmission media, it is further difficult to guarantee the real-time performance due to a communication load and a transmission delay of a transmission path.

Therefore, the present invention has been implemented to solve the above problem, and has an object to provide a distributed information integrating method and apparatus which can arrange data requested by a request side and supply the arranged data to the request side at a timing requested by the request side irrespective of a location of a processing device in which the data are stored, and also which can make an application program at the request side independent of changes of data storage medium or a transmission medium used for data collection.

SUMMARY OF THE INVENTION

In order to attain the above object, a distributed information integrating method according to the present invention comprises the steps of: collecting, by at least one first processing device, data stored in the processing device according to a predetermined collecting condition in response to occurrence of an event serving as a trigger; transmitting the collected data to a second processing device of an original data request side; and integrating the collected data received by the second processing device according to a predetermined integrating condition.

Since all the data which are needed by an application program on the second processing device are arranged and supplied to the second processing device, an application program in the second processing device is not required to instruct itself or another processing device to collect the data. Besides, the data can also be obtained at the time the needed data are not wholly arranged, but partially arranged. Further, the data which are received by the application program have a data type as indicated by the application program, and thus it is unnecessary to pay attention to the storage medium and the data structure of a data source, existence of the processing device in which the data are stored, or the existence of a transmission medium used for the data collection.

BRIEF DESCRIPTION OF THE DRAWINGS

FIG. 3B is a diagram (subsequent diagram) showing the data structure of the data integration management table 233 of the embodiment;

FIG. 5 is a diagram showing a data structure of an event linking data table 232 of the embodiment;

FIG. 7 is a flowchart showing the processing flow of a filtering processing 222 of the embodiment;

FIG. 8B is a flowchart (subsequent flowchart) showing the processing flow of the data integration processing 224 of the embodiment;

FIG. 9 is a diagram showing a data structure of a status control table 234 of the embodiment;

FIG. 12A is a diagram showing data items contained in a user data unit 712 of a message 831 of the application example;

FIG. 12B is a diagram showing set information of a data integration management table 233 of the application example;

FIG. 12C is a diagram showing set information of the event linking data table 232 of processing devices 802, 803 of the application example;

FIGS. 15A to 15C are diagrams showing set information of the data integration management table 233 of a processing device 1101 of the application example;

FIGS. 17A and 17B are diagrams showing set information of the data integration management table 233 and the event linking data table 232 of the application example.

DETAILED DESCRIPTION OF THE PREFERRED EMBODIMENTS

Preferred embodiments according to the present invention will be described hereunder with reference to the accompanying drawings.

Figure 1:
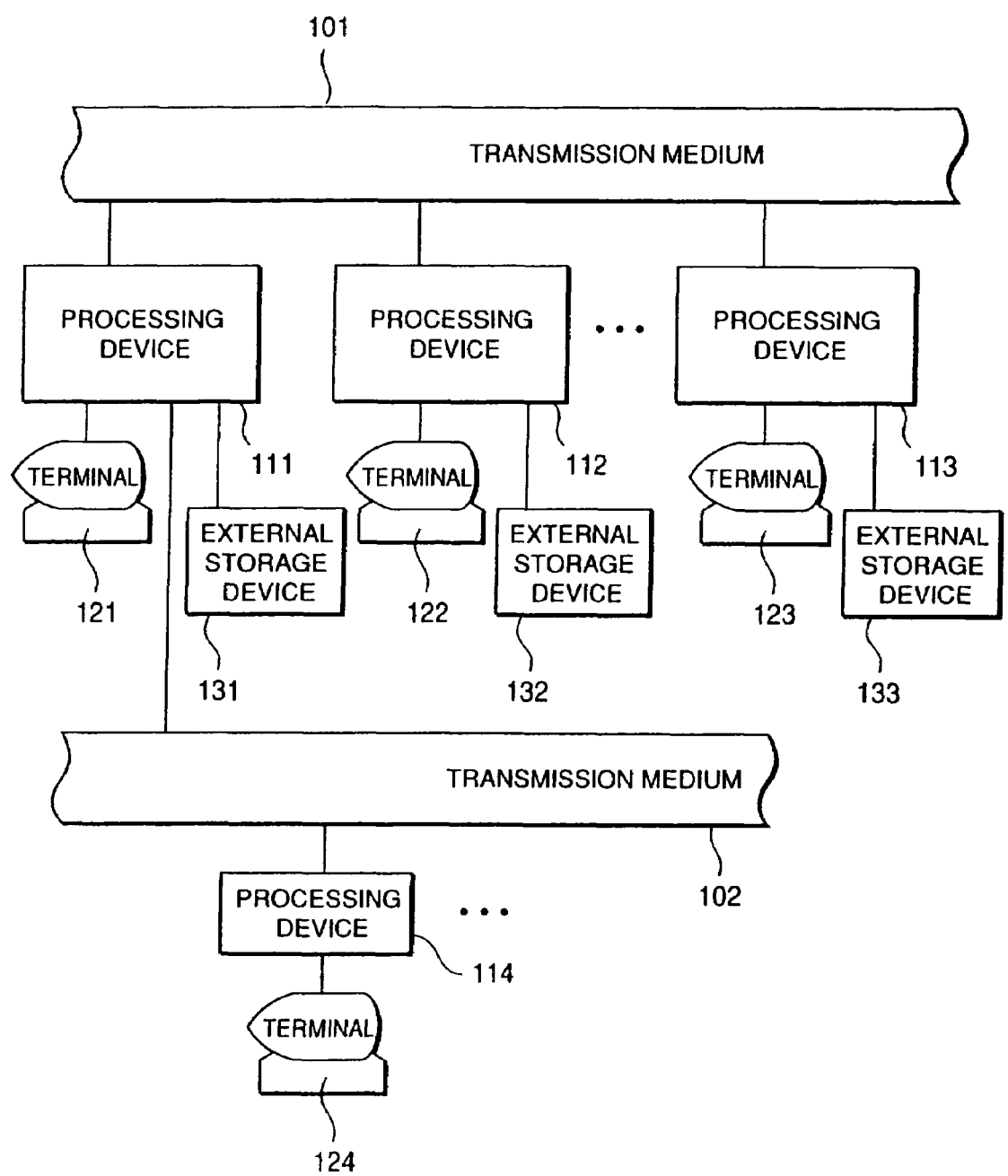
FIG. 1 shows a hardware structure of a distribution processing system according to an embodiment of the present invention.

FIG. 1 is a diagram showing the construction of a system to which the present invention is applied.

The system has processing devices 111 to 113 which mutually communicate (transmit/receive) data to one another through a transmission medium 101, and terminals 121 to 123 each having a display, a keyboard, etc. The processing devices 111 to 113 are connected to the terminals 121 to 123, respectively. Here, the terminal has a man/machine interface such as a display, a keyboard, a touch panel or the like, and has a function of controlling an application program to be executed on the processing device through the interface and referring to the output of the program. Each of the processing devices 111 to 113 has a data storage medium such as a main memory, and each of external storage devices 131 to 133 which are connected to the processing devices 111 to 113 respectively has a data storage medium such as a floppy disk, a hard disk or the like. However, the use of the external storage devices is not indispensable, and the processing device) having no external is storage device may be used.

In the present invention, the data stored in the processing device are defined as data which are stored in the storage medium inside the processing device or the external storage device. Further, the processing device 111 transmits/receives data to/from the processing device 114 through the transmission medium 102. The processing device 114 is connected to a terminal 124. As described above, the processing device can be connected to plural transmission media, and the data can be also communicated between the processing device 114 and each of the processing devices 112, 113 through the processing device 111.

Figure 2:
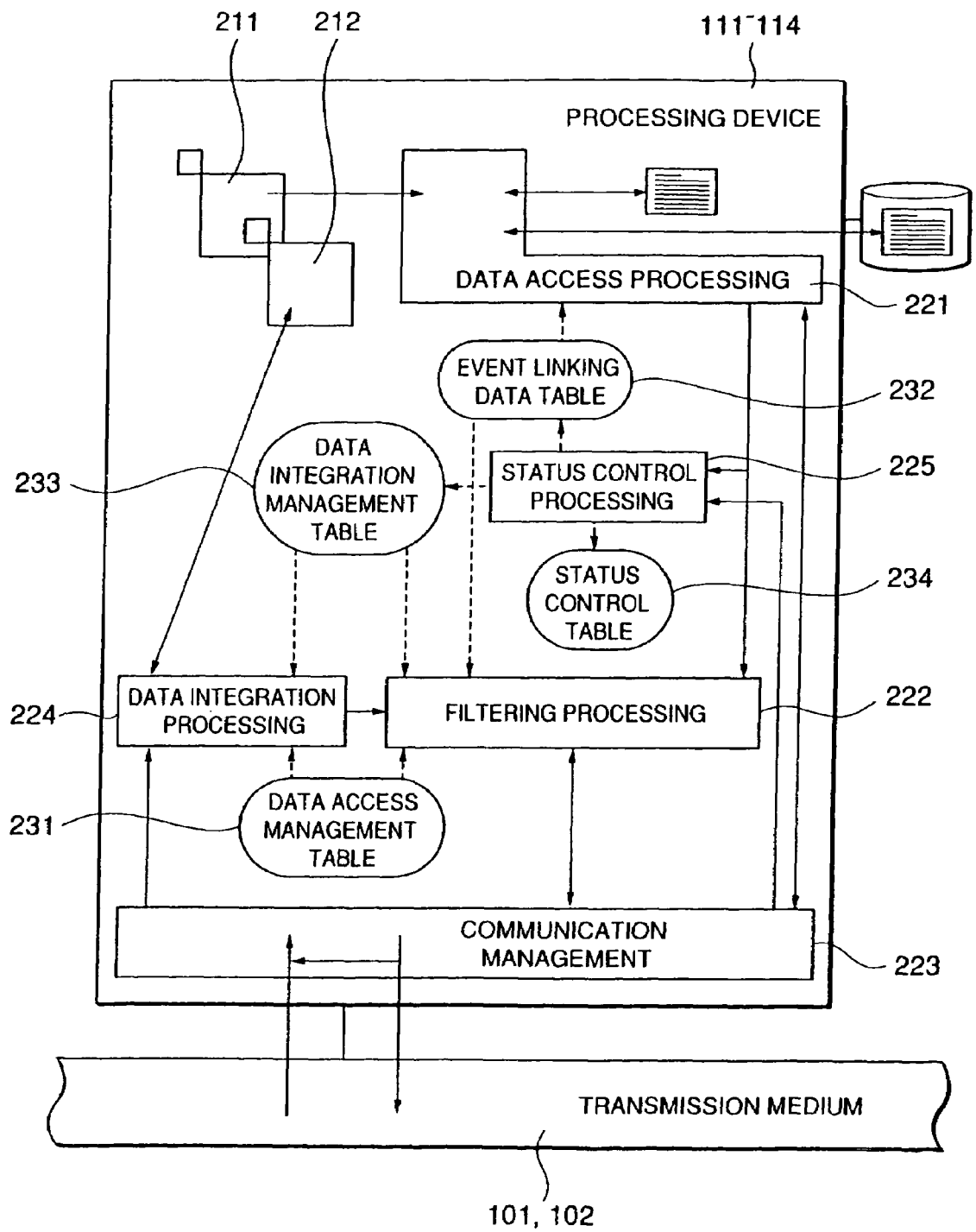
FIG. 2 shows a software structure of the distribution processing system of the embodiment.

FIG. 2 is a diagram showing the software structure in the processing devices 111 to 114. The application program is a program for executing business processing by using data stored in the self processing device (i.e., the processing device containing the application program) or another processing device, or by using data in a message which is received through the transmission medium 101, 102. The data access processing 221 is a program for managing an access to the data stored in the self processing device, and it allows a direct data access not through any storage medium such as a memory, an external storage device or a transfer memory. A communication management 223 is a program for managing a communication between programs in the self processing device and managing transmission/reception of a message with another processing device through the transmission medium 101, 102. A data access management table 231 stores the name and the attribute of data stored in the self processing device.

An event linking data table 232 sets the data item value to be obtained for an event and the request side to which the data item value should be transmitted. A data integration management table 233 defines reference sources of respective data to be integrated and the names of the data, and also defines an output option, etc. when the integrated data are delivered to the application programs 211, 121. Filtering processing 222 is a program for detecting events such as an event based on a periodic timer in the self processing device, an event based on data renewal and an event based on a message received from another processing device, obtaining the data in the self processing device through the data access processing 221 or obtaining the integrated data by referring to the event linking data table 232, the data access management table 231 and the data integration management table 233, and transmitting data obtained through the communication management 223 to another processing device which requests the data or the data integration processing 224 of the self processing device. The data integration processing 224 is a program for receiving the data which are transmitted from another processing device or the filtering processing 222 of the self processing device, referring to the data integration management table 233 and the data access management table 231 to integrate the data, and then delivering the integrated data to the application programs 211, 212 or the filtering processing 222. A status control table 234 sets conditions to start/end the collection of the data set in the event linking data table 232 and the integration of the data set in the data integration management table 233. Status control processing 225 is a program for detecting an event such as message reception, data renewal or the like, referring to the status control table 10 234 to detect the timing of starting/ending the data collection or the data integration, and activating relational control information of the event linking data table 232 and the data integration management table 233.

Figure 3A:
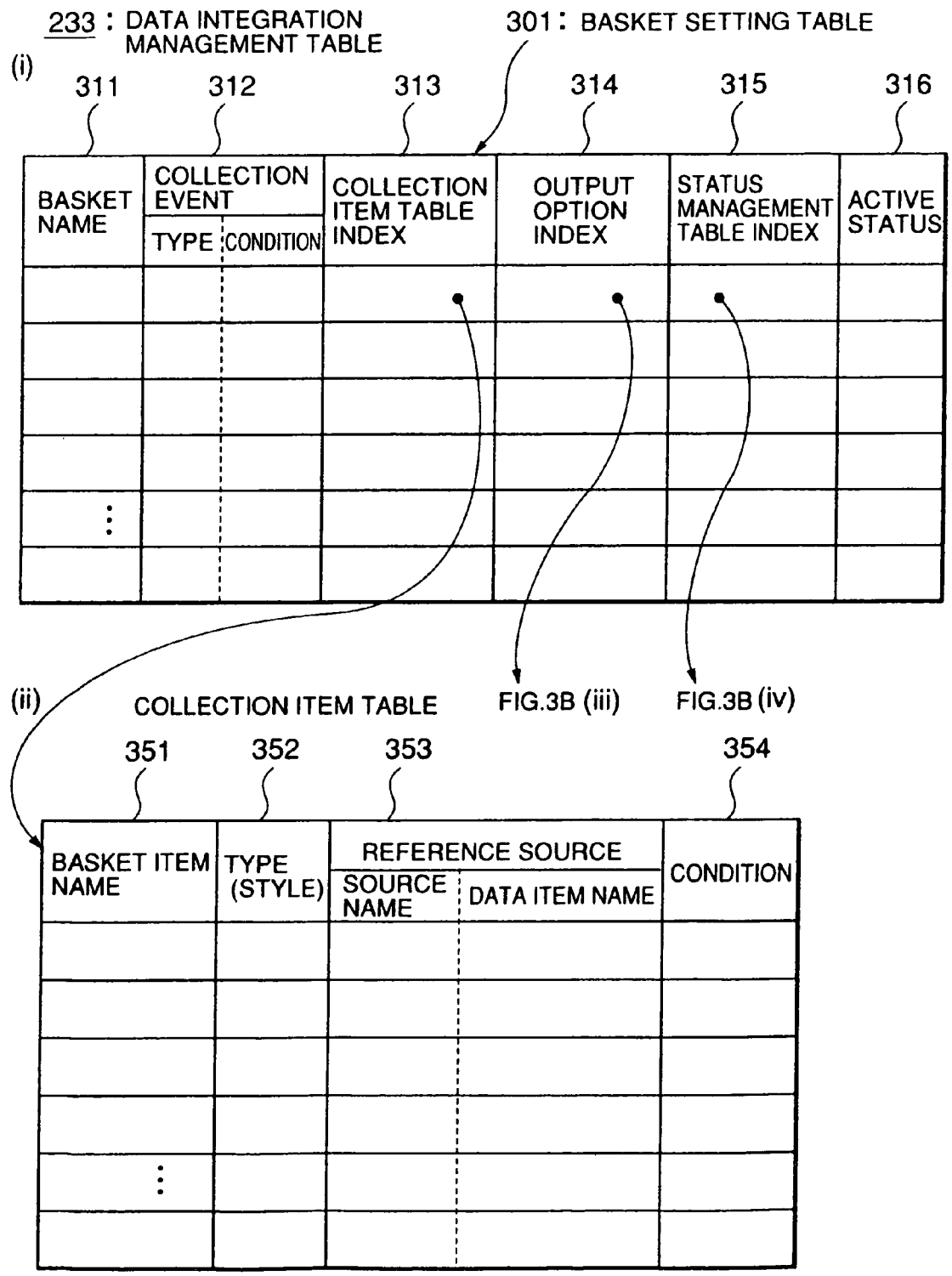
FIG. 3A is a diagram showing a data structure of a data integration management table 233 of the embodiment.

FIGS. 3A and 3B are diagrams showing the data structure of the data integration management table 233. A set of packed data which are needed by the application program is hereinafter referred to as a "basket". In FIG. 3A, (i) represents the construction of a basket setting table 301. Each record of the basket setting table 301 comprises a basket name 311, a collection event 312, a collection item table index 313, an output option index 314, a status management table index 315 and an activation status 316. The basket name 311 is the name for identifying the basket. The collection event 312 comprises a type and a condition. The type indicates the type of an event to be collected. For example, the type indicates that the event is message reception and a code indicating the content of the message, or indicates that the event is data renewal and the name of a renewed data table, or indicates that the event is based on a periodic timer and a timer interrupting period. The condition indicates a condition when the data are collected in response to the occurrence of an event. For example, when the event is message reception, the condition indicates a condition which is set to the value of the data item in the message. When the event is data renewal, the condition indicates the name of the renewed data item in the data table. When the event is based on the periodic timer, there is no condition. The collection item table index 313 is an index for indicating a storage place of the corresponding collection item table, and the data structure of the collection item table is shown in (ii) of FIG. 3A. The output option index 314 is an index for indicating a storage place of the corresponding output option table, and the data structure of the output option table is shown in (iii) of FIG. 3B. The status management table index 315 is an index for indicating a storage place of the corresponding status management table, and the data structure of the table is shown in (iv) of FIG. 3B. The activation status 316 indicates a status as to whether or not the data integration processing is to be performed.

The data structure of the collection item table is shown in (ii) of FIG. 3A. The collection item table defines a data item and a reference source to be collected in response to the occurrence of an event. Each record of the collection item table comprises a basket item name 351, a type (style) 352, a reference source 353 and a condition 354. The basket item name 351 is a data item name which is defined as an item constituting a basket. The type (style) 352 is the type of the corresponding data item, and it discriminates a long integer type, a short integer' type and a character type from one another. The reference source. 363 defines a source (origin) from which the data item is obtained, and it comprises a source name and a data item name. The source name is the data name of the reference source. For example when the event is message reception, the source name indicates the content code of the message, the identifier of the processing device and the name of the data table, the identifier of the processing device and the basket name 311 of a prepared basket or the like. The data item name is the name of the data item whose value is a target to be obtained in the data indicated by the source name. In this embodiment, when the source is located in a specific processing device, the data item name is indicated by the identifier of the processing device and the data name in the processing device. However, the source may be provided with a unique name in the system to indicate the name. The condition 354 indicates a condition when the value of the indicated data item is obtained from the source indicated by the reference source 353, and it is described on the basis of the comparison between the value of the data item of the data indicated by the source name and the value of the data item received by the event indicated by the collection event 312. For example, it is described like [the data item "ID" in the source data is equal to the data item "bar code number" in the reception message] or the like.

The data structure of the table which defines the output option is shown in (iii) of FIG. 3B. This table sets an option which can be selected when the collected data are delivered to the application program. Each record of the table comprises a time out 372, a data reception/delivery method 373, an AND/OR judgment 374 and a data request side 375. The time out 372 indicates a limit time from the time when the processing device detects an event serving as a data collection condition of a basket until the time when all the data are received. The data reception/delivery method 373 indicates an event type or a demand type. In the case of the event type, data are delivered to the program immediately when the data are arranged or there is a time-out. In the case of the demand type, the arranged data are kept stored, and when the program requests, the data thus stored are delivered to the program. The AND/OR judgment 374 indicates an AND type or an OR type. In the case of the AND type, "the data are arranged" means that the values of all the items constituting a basket are obtained or that there is a time-out. In the case of the OR type, "the data are arranged" means that the value of any item constituting a basket has been obtained, and the newest values which have been already obtained are used for the values of the other constituent items. The data request side 375 indicates the identifier of an application program to which the data are delivered or the filtering processing 222.

The data structure of the status management table is shown in (iv) of FIG. 3B. The status management table shows the collection status of the data item serving as a collection target in conformity with the event identifier. Each record of the status management table comprises an event identifier 391, a buffer index 392, a first event arrival time 393 and a collection judgment map 394.

The event identifier 391 indicates the number of an event when the AND/OR judgment 374 is the AND type, and it is a number for acquiring the synchronization of data transmitted from one or plural processing devices for the event. The buffer index 392 indicates the address of a buffer which is allocated to store items of data constituting a basket for every event identifier 391. The first event arrival time 393 stores the time when the event indicated by the event identifier 391 is detected, or the time when any basket constituting an item corresponding to the event identifier concerned is first received. The first event arrival time 393 is checked to judge whether a predetermined time has elapsed. By using a bit map, the collection judgment map 394 indicates whether the data are obtained for every item constituting the basket. When the value of the basket constituting item is delivered to the application program or the filtering processing 222 and the buffer is released, the record concerned is deleted. On the other hand, when the AND/OR judgment 374 is the OR type, the number of records of the status management table is equal to only one, and the buffer area indicated by the buffer index 392 is not released after the data are delivered to the program.

Figure 4:
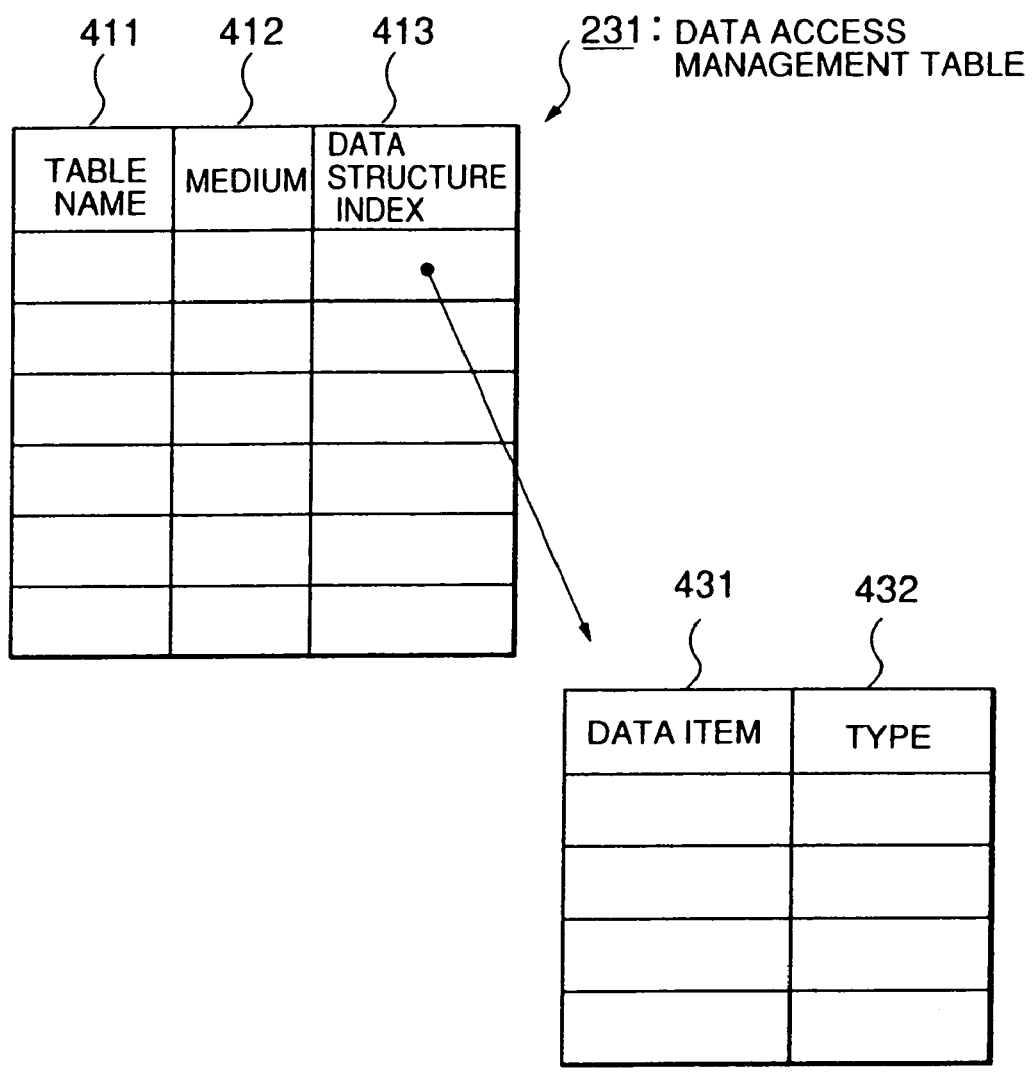
FIG. 4 is a diagram showing a data structure of a data access management table 231 of the embodiment.

FIG. 4 is a diagram showing the data structure of the data access management table 231.

The data access management table 231 is a table indicating what data are managed by the self processing device and what structure is owned by the data. The data managed by the self processing device contain a message data which is transmitted/received to/from another processing device. Each entry of the data access management table 231 comprises a table name 411, a medium 412 and a data structure index 413. The table name 411 indicates the name of the data table. The medium 412 indicates whether the data indicated by the table name 411 is a message, is stored in a main memory or is stored on a disc. The data structure index 413 indicates the memory address of a table which defines the structure of the data concerned. The table defining the data structure comprises a data item 431 and a type 432. The data item 431 indicates the name of the data item constituting the data concerned. The type 432 indicates the type of the data, and it is the same as the type (style) 352.

FIG. 5 is a diagram showing the data structure of the event linking data table 232.

The event linking data table 232 is a table for setting data in the self processing device to be collected and transmitted when an event occurs. That is, this table is a set of baskets when the data stored in the self processing device and the baskets prepared in the self processing device serve as a reference source. One line shown in the table corresponds to one record. Each record of the event linking data table 232 comprises a collection event 451, a response destination 452, a data name 453, a collection data item 454, a collection condition 455 and an activation status 456. The collection event 451 sets an event serving as a trigger for data collection, and has the same content as the collection event 312. The response destination 452 indicates the identifier of a processing device to which the values of the collected data items are transmitted. For example, it indicates the identifier of a processing device to which the data renewal event of the self processing device is required to be notified. The data name 453, the collection data item 454 and the collection condition 455 have the same function as the reference source 353 and the condition 354 as show in (ii) of FIG. 3A. The activation status 456 indicates a status as to whether or not the collection and transmission of data indicated by the corresponding record should be performed. The event linking data table 232 is a set of data for which the self processing device will serve as a reference source, for every collection event and every response destination.

Figure 6A:
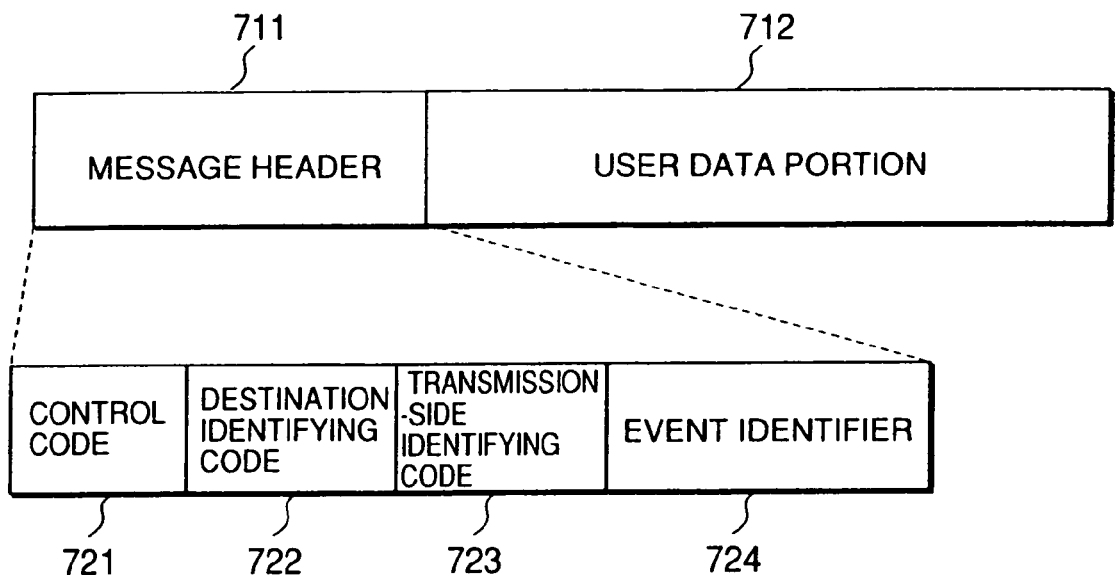
FIGS. 6A and 6B are diagrams showing a data structure of a transmission and reception message of the embodiment.

FIG. 6A is a diagram showing the data structure of a message which the communication management 223 transmits/receives between processing devices or in a processing device. The message comprises a message header 711 for communication control, and a user data portion 712 which are referred to by the application program 211, the filtering processing 222 and the data integration processing 224. The message header 711 comprises a control code 721 for communication, a destination identifying code 722, a code 723 for identifying a processing device at the transmission side, and an event identifier 724. The event identifier 724 is a serial number for time-sequentially discriminating the message which is transmitted by the processing device, and it can be expressed by the combination of the identifier of the processing device and the serial number in the processing device. Even for messages which are issued by the same program of the same processing device, the occurrence order of these messages can be discriminated. As the destination identifying code 722 it is possible to use a content code which is disclosed in Japanese Laid-open Patent Application No. Sho-56-111353, for example. The user data portion 712 comprises plural data items, for example, and contains the value of each data item. The processing device which receives the message refers to the data access management table 231 to obtain the type of each data item and cut out the value of each data value. Further, the communication management 223 may refer to the data access management table 231 to recognize the type of each data item, and convert the byte order of the data item value so that it can be processed in the self processing device.

Figure 6B:
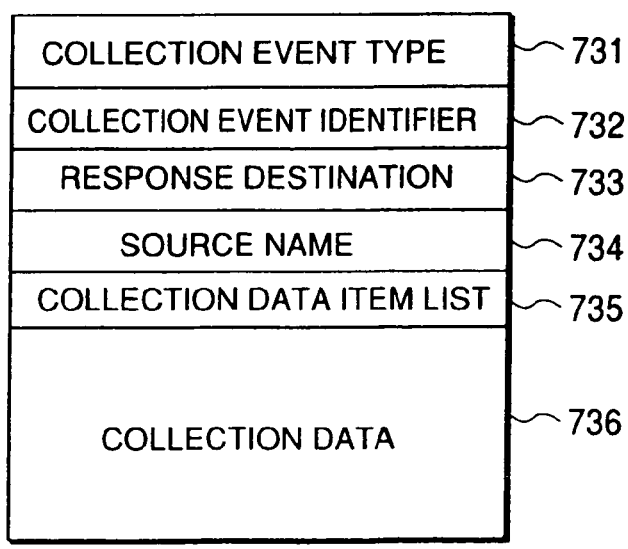

FIG. 6B is a diagram showing the data structure of the user data portion 712 when data which are collected in association with the event generated by the filtering processing 222 are transmitted to the request side. The collection event type 731 is the same type as the collection event 312 ((i) of FIG. 3A), that is, the same type as the collection event 451 (FIG. 5). The collection event identifier 732 sets the event identifier of the event generating source. For example, when the event is message reception, the event identifier 724 of the received message is set. When the event is based on the periodic timer, the serial number, etc. are set in the self processing device. When the event is data renewal, the serial number, etc. are set in the processing device in which the renewed data are stored. In the processing device which collects the relational data upon reception of a message notifying this data renewal as a trigger, the collection event identifier 723 attached to the renewed data is specified. The response destination 733 is an identifier of a processing device which serves as a data transmission destination. The source name 734 is the data name of the reference source, and for example, it is the identifier of the processing device, the name of the data table, etc. The collection data item list 735 sets a list of the collected data item names. The collection data 736 sets the value of each data item in correspondence with the data item of the collected data item list 735. The data structure shown in FIG. 6B is an example, and the data structure may, be set so that plural collected data on the same event are collectively transmitted while riding together, or so that the collected data are collectively transmitted to plural response destinations.

The messages which are received by the filtering processing 222 and the data integration processing 224 and are other than the message when the filtering processing 222 transmits the collected data to the response destination, are discriminated from the collection data message on the basis of the message header 711 or the content of the user data portion 712. It may be made to conform with the data format of FIG. 6B. For example, the message in which the event identifier 724 and the collection event identifier 732 have the same content is discriminated as a message serving as a trigger for data collection. Further, the control data or the message which is received from a specific port of the processing device can be discriminated as a specific message by the identifier of the port.

FIG. 7 is a flowchart showing the process flow of the filtering processing 222. The filtering processing 222 waits for occurrence of an event (step 501). In the case of the message reception event, the communication management 223 receives the message to start the filtering processing 222. In the case of the data renewal event in the self processing device, the data access processing 221 or the data integration processing 224 starts the filtering processing 222 to deliver the renewal data. The case where the renewal data are transmitted from the data integration processing 224 means a case where a data-integrated basket is delivered to the filtering processing 222. In the case of the data renewal event of another processing device, the communication management 223 receives the message containing the renewal data to start the filtering processing 222. Further, the reception of control data transmitted from a measurement device or a sensor which is connected to the self processing device directly or through a transmission medium is also set as occurrence of an event. In the case of the periodic event, a timer interruption occurs by the periodic timer to start the filtering processing 222 (step 551). When the filtering processing 222 detects the event, the type of the occurring event and the appendant data are obtained (step 502). Subsequently, the event linking data table 232 (FIG. 5) is referenced to search whether there is data or a basket which is required to be obtained in association with the occurring event (step 503). That is, the type of the occurring event and the appendant data are checked against the collection condition of the collection event 451 to judge whether there is a record in which both are coincident. Here, the record which is set as a search target is a record in which the activation status 456 is set to an active status. As a result, if no record to be discharged (transmitted) is located (step 504:N), the processing returns to step 501. If the corresponding record is located (step 504:Y), a data item value satisfying the collection condition 455 for the data item 454 of the data indicated by the data name 453 of the record concerned is obtained (step 505). If there is no collection condition 455, the unconditional status is set. When the data are obtained, the data access management table 231 (FIG. 4) is referred to in order to obtain the medium 412 of the corresponding data and the type 432 of the corresponding data item, and then the data access processing 221 is started to obtain the data. When the data thus obtained is a basket, the basket name 311 and the basket item name 351 of the data integration management table 233 (FIG. 3A) are referenced to obtain the type 352 thereof. When there are plural data to be discharged, all the data are obtained in the same manner as described above. Subsequently, transmission data are prepared on the basis of the data thus obtained (step 506). The response destination 452 of the corresponding record is stored in the response destination 733, the data name 453 thereof is stored in the source name 734, and the collection data item 454 thereof is stored in the collection data item list 735. Further, an identifier which is generated by the filtering processing 222 is stored in the event identifier 724.

Finally, the data are transmitted to the data integration processing 224 of the self processing device or another processing device through the communication management 223 (step 507), and the processing returns to step 501.

Figure 8A:
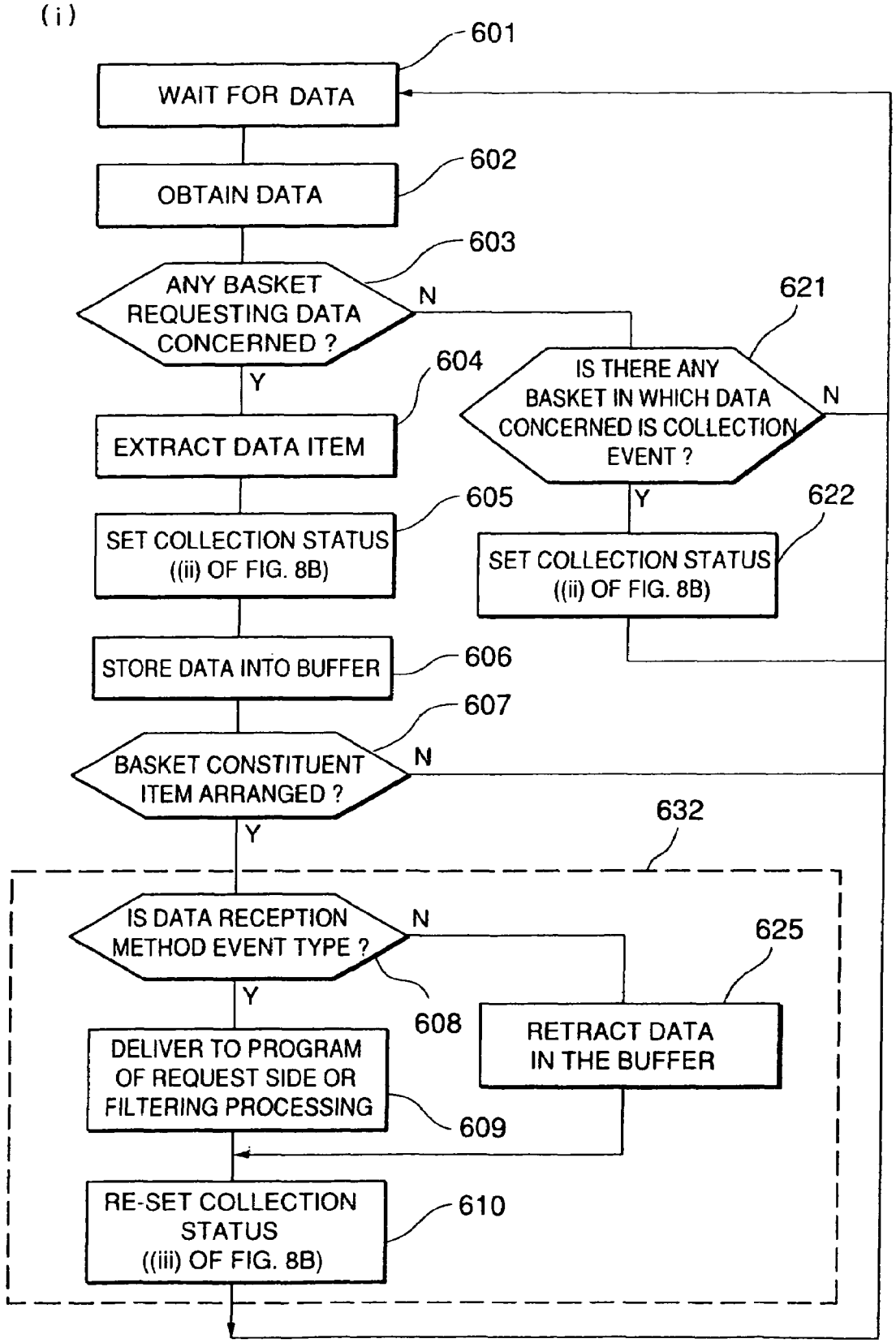
FIG. 8A is a flowchart showing the processing flow of data integration processing 224 of the embodiment.
Figure 8C:
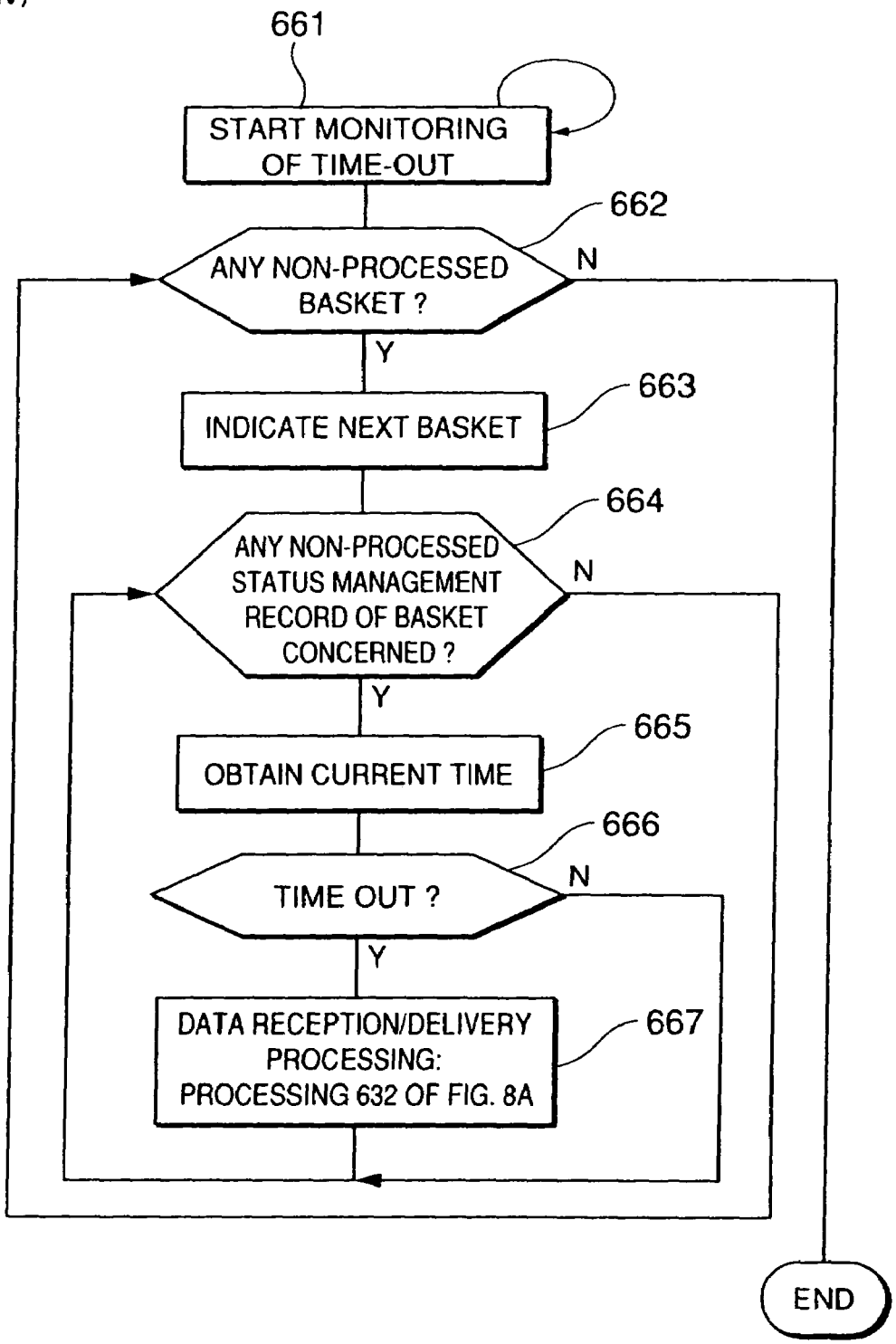
FIG. 8C is a flowchart (subsequent flowchart) showing the processing flow of the data integration processing 224 of the embodiment.

FIGS. 8A, 8B and 8c are flowcharts showing the process flow of the data integration processing 224. The data integration processing 224 waits for arrival of data from the self processing device or another processing device (step 601). When data or a message is received through the communication management 223 (step 602), it is judged by referring to the data integration management table 233 (FIG. 3A) whether there is any basket which requests the received data (step 603). That is, if the received message is the collection data, the source name 734 thereof and the data item name of the collection data item list 735 are checked against the reference source 353 of the data integration management table 233 to judge whether there exists any basket for which the received data is set as a basket constituting item. At this time, the type of the collection data 736 is obtained by referring to the type 352 of the basket constituting item. If there is no corresponding basket (step 603: N), it is judged by referring to the data integration management table 233 (FIG. 3A) whether there is any basket for which the received data is set as a collection event (step 621). That is, the collection event type 731 of the received message (and the collection data 736) is checked against the collection event 312 of the table integration management table 233 to judge whether any basket exists which satisfies the collection condition. At this time, the type of the collection data 736 is obtained by referring to the type 432 of the data item 431 corresponding to the data item of the collection data item list 735 of the data name 411 which corresponds to the source name 734 of the data access management table 231 (FIG. 4). When there is a corresponding basket, the setting or renewal of the collection status shown in (ii) of FIG. 8B is performed (step 622), and then the processing returns to step 601. When there is no corresponding basket, the processing immediately returns to step 601. When there is a basket requesting the received data (step 603:Y), the data item which is necessary to the basket concerned is extracted from the reception message (step 604). That is, the value of at least one data item is extracted from the collection data 736. Thereafter, the collection status in the status management table shown in (ii) of FIG. 8B is set or renewed (step 605).

In the search operation of the data integration management table 233 of the steps 603 and 621, the search target is limited to baskets in which the active status 316 is set to an active status. Thereafter, the data item value extracted in step 604 is stored into the memory location of the data item value concerned in a buffer area which is indicated by the buffer index 392 of the status management table ((iv) of FIG. 3B) indicated by the status management table index 315 of the basket concerned (step 606).

Next, it is judged whether the constituent items of the basket are arranged (step 607). The collection status of the data is judged by referring to a status management table collection judgment map 394 of the basket concerned. The condition when the data are arranged is determined by the AND/OR judgment 374 of the table ((iii) of FIG. 3B) which sets the output option of the basket concerned. When the AND/OR judgment 374 is the AND type, the time when all the constituent items are obtained corresponds to the time when the arrangement is made. When the AND/OR judgment 374 is the OR type, the time when any one of the constituent items is obtained corresponds to the time when the arrangement is made. The latest data on the buffer of the constituent items which were previously obtained is used as the other constituent items.

When it is judged that the data are arranged (step 607:Y), the processing shifts to the processing 632 to deliver the data to the request side. If the data are not arranged (step 607:N), the processing returns to step 601. In the processing 632, it is judged by referring to the output option table of the basket concerned whether the data receiving/delivering method 373 is an event type or a demand type (step 608). If the method 373 is the event type (step 608: Y), the data are delivered to the application program indicated by the data request side 375 of the basket concerned or the filtering processing 222 (step 609). If the method 373 is the demand type (step 608: N), the content of the buffer area of the basket concerned which is indicated by the buffer index 392 is stored (retracted) in the queue (step 625). The application program can take out the data from the queue. After the processing of the steps 609 and 625, the re-setting of the collection status, that is, the arrangement of the status management table and the buffer as shown in (iii) of FIG. 8B is performed (step 610), and the processing returns to step 601.

The flowchart showing the flow of the setting and renewal processing of the status management table is shown in (ii) of FIG. 8B. The status management table of the basket concerned is searched to judge whether there is a record having the collection event identifier 732 of the received message (step 641). When the AND/OR judgment 374 of the output option table is an AND type, the output option is searched on the basis of the event identifier 391. When it is an OR type, the output option table has only one record, and thus it is judged on the basis of the event identifier 391 of the record whether the record is the corresponding record. If there is no corresponding record (step 641:N), the record is added to the table (step 642), the collection event identifier 732 of the received message is added to the event identifier 391 of the record, and the buffer area is kept to set the index thereof to the buffer index 392 (step 643). The time when the event arrives is set to the first event arrival time 393 (step 644). Thereafter, the bit corresponding to the basket item thus obtained in. the collection judgment map 394 is set to be already gained (step 645). If there is any corresponding record (step 641: Y), only the processing of step 645 is performed.

The flowchart showing the flow of the processing of arranging the status management table and the buffer is shown in (iii) of FIG. 8B. First, it is judged whether the AND/OR judgment 374 of the output option table of the basket concerned is an AND type or not (step 651). If it is the AND type (step 651:y), the overall item value of the basket concerned is unnecessary, and thus the buffer area indicated by the buffer index 392 of the status management table is wholly released (step 652), and the content of the record having the corresponding event identifier in the records of the status management table is cleared (step 653). If it is the RO type (step 651:N), nothing is done.

The flowchart showing the flow of the time-out monitoring processing is shown in (iv) of FIG. 8C. When the program of this processing is periodically started (step 661), it is judged whether all the records of the basket stored in the basket setting table 301 of the data integration management table 233 are processed (step 662). If there is any non-processed basket (step 662:Y), the pointer is positioned to the records of a next basket (step 663) to judge whether all the records of the status management table of the basket concerned are processed (step 664). If there is any non-processed record (step 664:Y), the pointer is positioned to the next record of the status management table to obtain a current time (step 665), and the current time is compared with the time-out setting 372 of the basket concerned to judge whether the difference between the current time and the first event arrival time 393 has reached a predetermined value or a limit time (time-out) (step 666). When it is time-out (step 666:Y), the data reception/delivery processing 632 of FIG. 8A is executed (step 667), and the processing then returns to step 664. If the record concerned is not time-out (step 666:N), the processing returns to step 664. If all the records of the status management table are processed or the table is cleared (step 664:N), the processing returns to step 662. When the processing of all the baskets is finished (step 662:N), is the time-out monitoring processing is finished. The status when the data collection has not been completed due to interruption by another processing device or the like is monitored by the time-out monitoring processing.

FIG. 9 is a diagram showing the data structure of the status control table 234. A line of the table shown in FIG. 1 corresponds to one record. An event 1611 is the same as the collection event 312 (FIG. 3A) and the collection event 451 (FIG. 5). Start/end 1612 indicates whether the event is an event at the start of the distributed information integrating processing or an event at the end of the distributed information integrating processing. A condition frequency 1613 sets the frequency at which the event 1611 is detected to perform the start or the end indicated by the start/end 1612. An event counter 1614 represents the current detection frequency. A control target 1615 indicates whether a target under the start/end control is a basket or collection data. A control target index 1616 represents a pointer to a record for which the control target is set. If the target is the basket, it indicates the record of the basket setting table 301 (FIG. 3A). If the target is the collection data, it indicates the record of the event linking data table 232 (FIG. 5).

Figure 10:
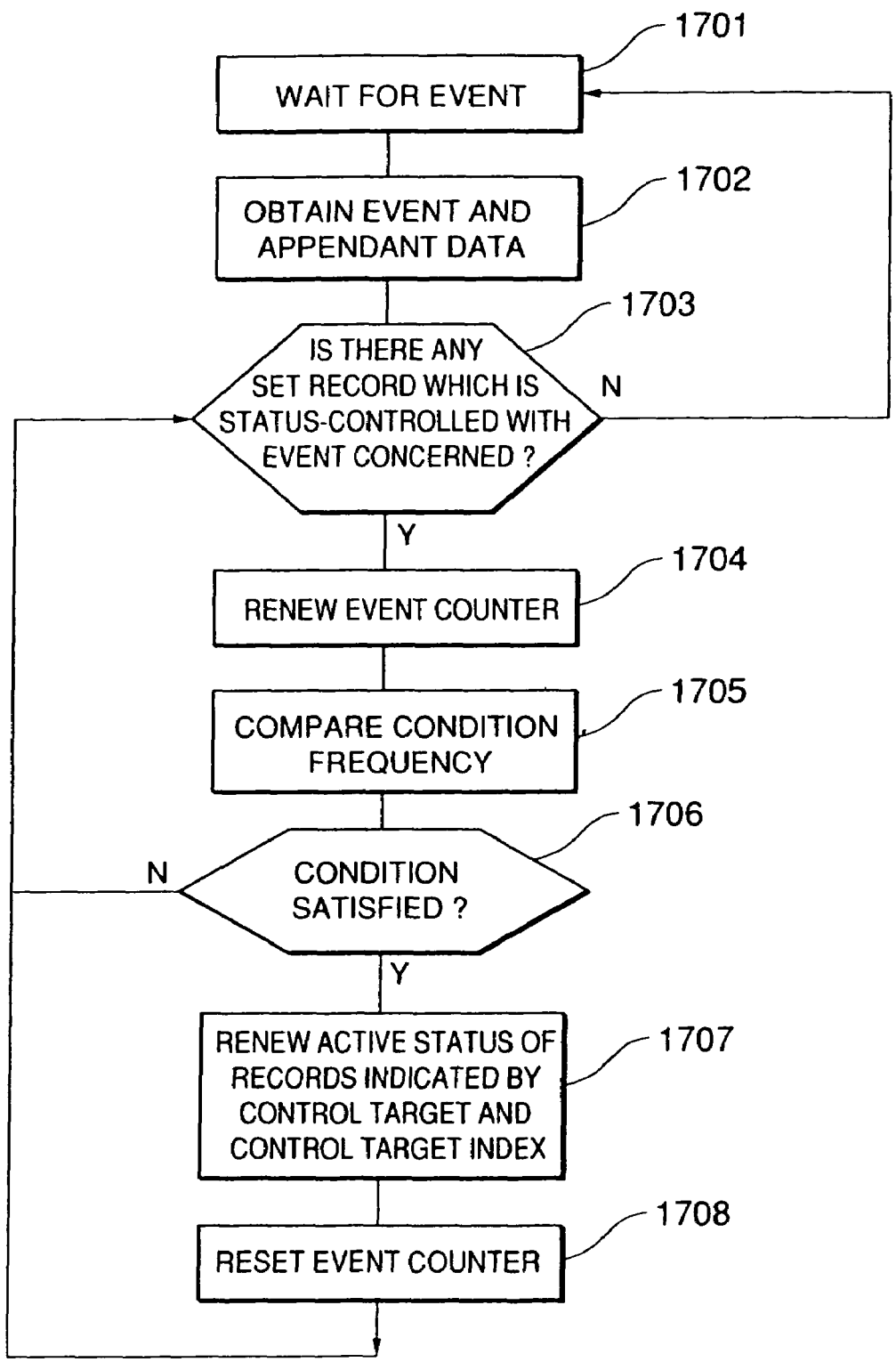
FIG. 10 is a flowchart showing the processing flow of a status control processing 225 of the embodiment.

FIG. 10 is a flowchart showing the processing flow of the status control processing 225. The processing waits for reception of an event (step 1701). When the event is received, the type of the event and the appendant data are obtained (step 1702). Next, the status control table 234 (FIG. 9) is searched to judge whether there is any record which is set to be subjected to the status control in response to this event (step 1703). The search is the processing of searching for a record having an event 1611 which satisfies the type of the event and the appendant data. If there is no corresponding record (step 1703:N), the processing returns to step 1701. If there is any corresponding record (step 1703:Y), the event counter 1614 of the record concerned is incremented by 1 to renew the count value (step 1704), and the condition frequency 1613 and the renewed event counter 1614 are compared with each other (step 1705). If both are not equal to each other (the condition is not satisfied) (step 1706:N), the processing returns to step 1703. If the condition is satisfied (step 1706:Y), the active status 316 or the active status 456 of the record which is indicated by the control target 1615 and the control target index 1616 is renewed (step 1707). That is, if the start/end 1612 of the record of the status control table 234 which is currently being processed indicates the start, the active status 316 or the active status 456 of the record which is indicated by the control target index 16,16 is set to the active status. If the start/end 1612 indicates the end, the active status 316 or the active status 456 of the record which is indicated by the control target index 1616 is set to the non-active state. Finally, the event counter 1614 of the record under processing is reset (step 1708), and the processing returns to step 1703. The start/end of the data collection can be controlled on the basis of the occurrence frequency of the event or the frequency of data collection by the status control processing 225, and the data collection control can be finely performed. For example, 'collection of data such as a device status, etc. is started in synchronization with an abnormal occurrence event, and thus this embodiment is applicable to such a case where information on a status trend under unattended operation is to be obtained.

Next, a case where distributed information is integrated by using the above-described method and construction will be described hereunder.

Figure 11:
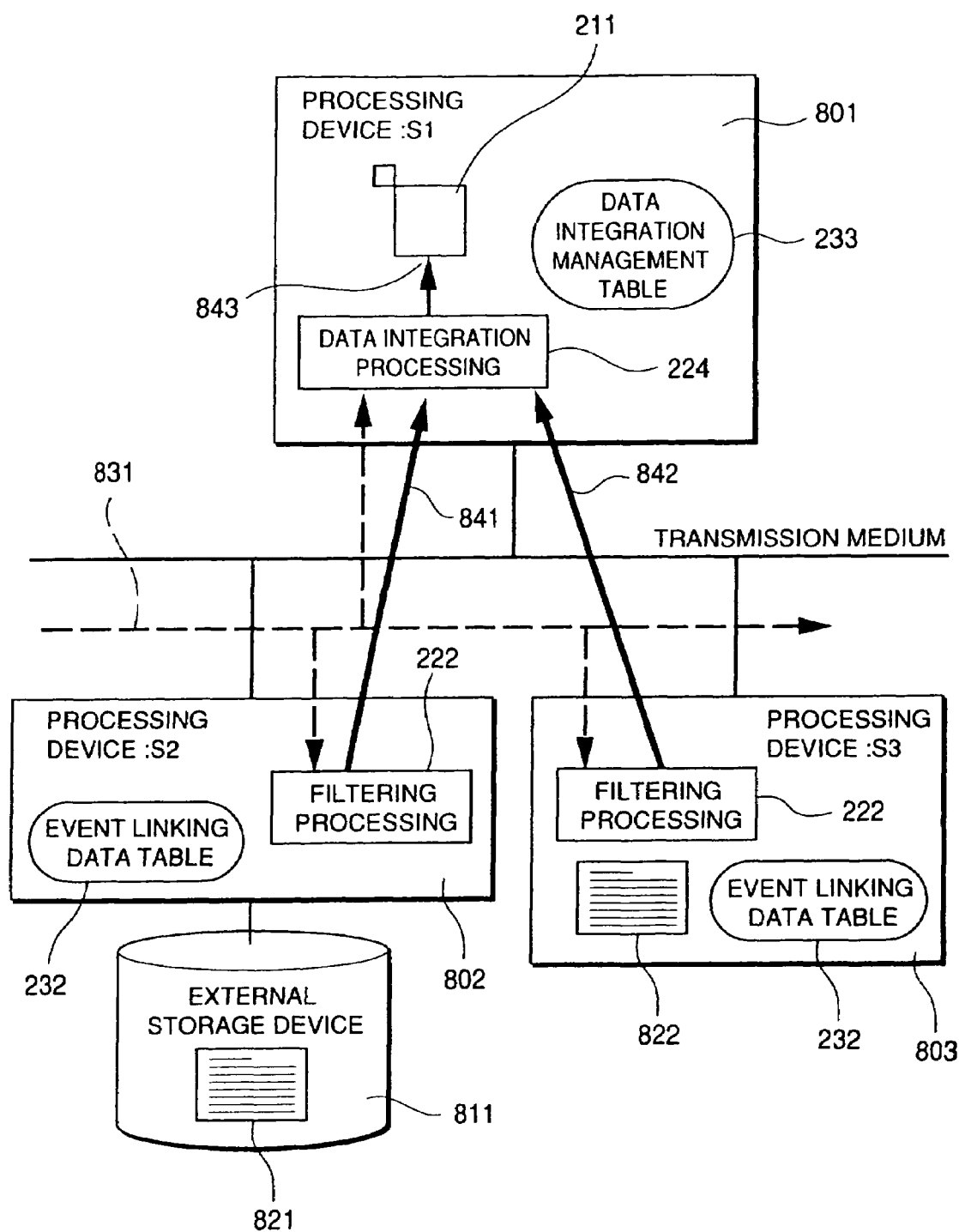
FIG. 11 is a diagram showing an application example when reception of a message is an event.

FIG. 11 is a diagram showing an applied case where the event is message reception. The system comprises processing devices 801, 802 and 803 which are connected to a common transmission medium. On the basis of a message 831 as a trigger event which is broadcasted through the transmission medium, the filtering processing 222 of the processing device 802 collects the data in a table data 821 stored in an external storage device (disc) 811 thereof and the filtering processing 222 of the processing device 803 collects the data in a table data 822 stored in an internal storage device (memory) thereof in order to transmit these data as messages 841 and 842 to the processing device 801, respectively. The data integration processing 224 of the processing device 801 integrates the messages 831, 841 and 842 to prepare the data 843 constituting a basket and deliver the data to the application program 211.

A list of data items contained in the user data portion 712 of the message 831 is shown in (i) of FIG. 12A. The data structure of the table data 821 owned by the processing device 802 is shown in (ii) of FIG. 12A. Each record comprises data items and has a part ID as a key as shown in (ii) of FIG. 12A. The data structure of the table data 822 stored by the processing device 803 is shown in (iii) of FIG. 12A, and the table data 822 comprises data items 916-919 with the lot number (Lot No.) as a key.

FIG. 12B is a diagram showing an example of the data integration management table 233 of the processing device 801 (S1). The data-integrated basket is defined by a record 921 of a basket setting table 301 and a table linked from the record 921. The basket name is "production instruction". The collection event is limited to events each having a message (Msg) in which the destination discrimination code 722 is "line access" and a condition in which the part ID is larger than 1000. The item to be collected when a message satisfying the collection condition of the collection event is received and when the collection data are received is set in records 941 to 945 of the collection item table. The item values which are defined in the records 941 and 942 are data which are obtained from the reception message serving as the collection event. The item values defined in the records 943 and 944 are the values of data items which are "condition value 1" and "condition value 2" of the table data 821 in "manufacturing condition" of the processing device 802 (S2). The "condition value 1" satisfies such a condition that the part ID of "manufacturing condition" is equal to the part ID of the collection event message, and the "condition value 2" satisfies such a condition that the quality reference value is larger than or equal to the quality reference value of the collection event message in addition to the "condition value 1". Likewise, the item value defined in the record 945 is the value of the data item "lot track record" of the table data 822 "manufacturing track record" of the processing device 803 (S3). The "lot track record" means the lot track record of records which are contained in the records of the table data 822 and in which "lot number" is equal to the lot number of the collection event message. Each basket constituent item is delivered to a program shown in the data request side 375 (FIG. 3B) in the format of a long integer type or a 6-byte character type as indicated in the field of the type (style).

A setting example of the event linking data table 232 of the processing device S2 is shown in (vi) of FIG. 12C. Records 951 and 952 are obtained by extracting records 943 and 944 on the processing device S2 in the collection item table of the data integrating management table 233, respectively. The collection condition of the collection event is the same collection condition as the collection event of the processing device S1. The response destination of the collected data is the processing device S1 of the request side. (vii) of FIG. 12O shows a setting example of the event linking data table 232 of the processing device 803 (S3). The record 961 is obtained by extracting the record 945 on the processing device 53 in the collection item table of the data integration management table 233.

Figure 13:
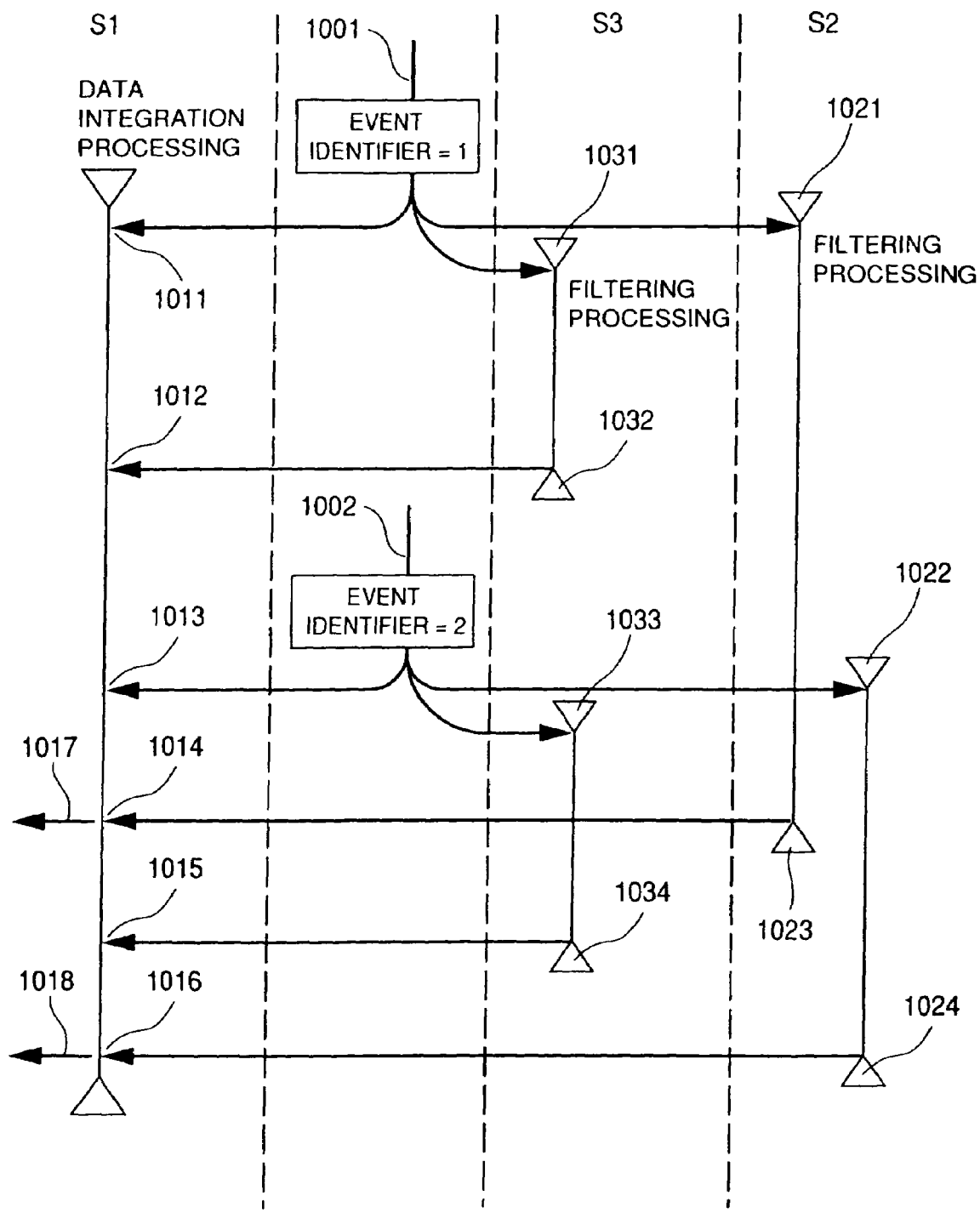
FIG. 13 is a diagram showing an example of an event sequence in the application example.

FIG. 13 is a diagram showing an event sequence in this embodiment, and shows the operation of the processing devices S1, S2 and S3 after the message 831 of the collection event is received. First, when the message 1001 "line access" of the event identifier 1 is passed through the transmission medium, the processing device S1 ensures a data storage area, obtains the data items "part ID" and "lot number" from the message, and then stores them into the data storage area (1011). At the same time, the processing device S2 starts to obtain the data items "condition value 1" and "condition value 2" (1021), and starts to obtain the data item "lot track record" (1031). The processing device S3 finishes obtaining the data (1032), and transmits the data to the processing device S1 (1012). The processing device S1 receives the data, and stores the data into the data storing area for the event identifier 1 which is ensured in the step 1011. Subsequently, the message 1002 "line access" of the event identifier 2 is passed (1002), and the processing device S1 receiving the message newly ensures the data storage area for the event identifier 2 although the collection processing on the event identifier 1 is not finished (1013).

The processing device S2, 53 start to obtain data with a message 1002 as a trigger (1022, 1033). Subsequently, the processing device S3 finishes the data obtaining processing in association with the event identifier 1 (1023), and transmits the data to the processing device S1. The processing device S1 receives the data (1014). If the AND/OR judgment 374 is specified as the AND type, it judges that the data are arranged, and the data are delivered to the application program 211 (1017). Subsequently, in the same manner as described above, the processing device S1 receives the data (1034) obtained by the processing device S3, stores the data into the ensured data storage area (1015), receives and stores the data (1024) obtained by the processing device S2 (1016), and delivers the data to the application program 211 (1018). When the application program 211 is set to receive the data in the OR type, the value of the latest data item received is delivered to the application program 211 at all the time points 1011 to 1016.

As described above, according to this embodiment, the application program 211 can obtain data which are distributively stored in the processing devices S2, S3 at the time the message 831 occurs. The application program 211 can obtain only the values of necessary data items without considering the processing device in which the data are stored and the data structure of the data. Further, only the data which are interlocked with the occurrence of the message 831 are delivered, and thus it is not necessary for all data containing necessary and unnecessary data to be obtained and for the necessary data to be selectively extracted by judging the contents of all the data. Further, even when the data structure of the data tables 821 and 822 is altered, it is sufficient to merely alter the set value of the table in association with the table access management table 231 and the data integration management table 233, and it is unnecessary to review the source code of the application program 211.

Figure 14:
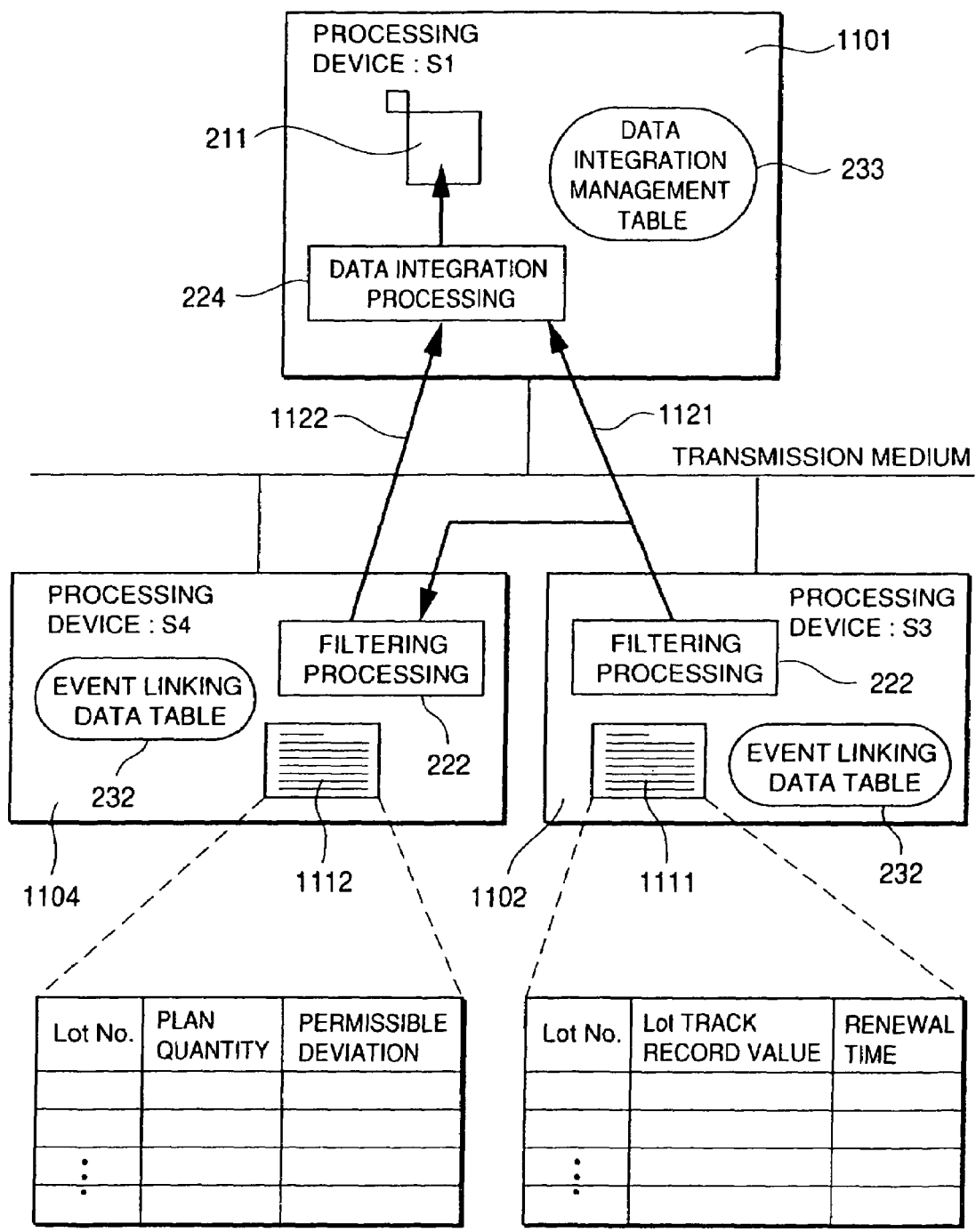
FIG. 14 is a diagram showing an application example when data renewal is an event.

FIG. 14 is a diagram showing an applied case where the data renewal is an event.

The system comprises processing devices 1101 (S1), 1102 (S3) and 1104 (S4) which are connected to a common transmission medium. In response to the renewal of the data table 1111 as a trigger event, the filtering processing 222 of the processing device S3 refers to the event linking data table 232 to transmit the data of the data table 1111 as a message 1121 to the other is processing devices S1 and S4. The filtering processing 222 of the processing device S4 receives the message as a data renewing event of the other processing devices, and refers to the event linking data table 232 to collect the relational data from the data table 1112 and transmit a message 1122 to the processing device S1 serving as the response destination.

The data integration processing 224 of the processing device 51 refers to the data integration management table 233 to integrate the received data, and delivers the integrated data to the application program 211. As described above, the relational data can be transmitted to the processing device S1 with the renewal event of the data table 1111 as a trigger. Therefore, the program which renews the data table 1111 is not required to transmit the renewal event to the processing device S1, and also, the application program 211 of the processing device S1 is not required to monitor the renewal of the data table 1111 and may merely wait for arrival of necessary data, so that it can be devoted to the processing which uses the arriving data.

FIG. 15A is a diagram showing a setting example of the data integration management table 233 of the processing device S1. The data-integrated basket is defined by the record 1211 of the basket setting table 301 and the table linked therefrom. The basket name is "advancement". The collection event is the renewal of the data item "lot track record" in the data table 1111 "manufacturing track record" of the processing device S3. The items to be collected when the collection event and the collection data are received are set in records 1231 to 1233 of the collection item table. The item values defined in the records 1231 and 1232 are data which are obtained from the data items "lot number" and "lot track record" in the data table 1111 "manufacturing track record" of the processing device S3 respectively, and these item values are contained in the message 1121. The item value defined in the record 1233 is the value of the data item "planned quantity" of the data table 1112 "manufacturing plan" of the processing device S4.

FIG. 15B is a diagram showing a setting example of the event linking data table 232 of the processing device S3. The records 1241 and 1242 are obtained by extracting the records 1231 and 1232 on the processing device S3 in the collection item table of the data integration management table 233 respectively. The response destination of the collected data are the processing devices S1 and S4 at the request side. FIG. 15O is a diagram showing a setting example of the event linking data table 232 of the processing device S4. The record 1251 is likewise obtained by extracting the record 1233 on the processing device S4 in the collection item table of the data integration management table 233.

The above embodiments are directed to the applied case where the message is set as an event and the case where the data renewal is set as an event. In the case of the periodic event, the data collection is performed in the same manner. The event linking data table 232 and the data integration management table 233 are set as described above, and data and message data which are stored into plural processing devices can be collected in a composite manner. By setting these tables, the application program 211 is allowed to receive the data. Therefore, it is unnecessary to take the medium or the processing device into account, collect the data while sequentially inquiring about the data and review the programs due to alteration of the data structure of the messages and the data tables, so that the labor required for developments can be greatly reduced. Further, the data are not collected after the event is detected, but upon occurrence of an event the plural processing device sides cooperate with one another to transmit the indicated data, so that the data can be obtained on a real-time basis, and the processing performance can also be enhanced.

Figure 16:
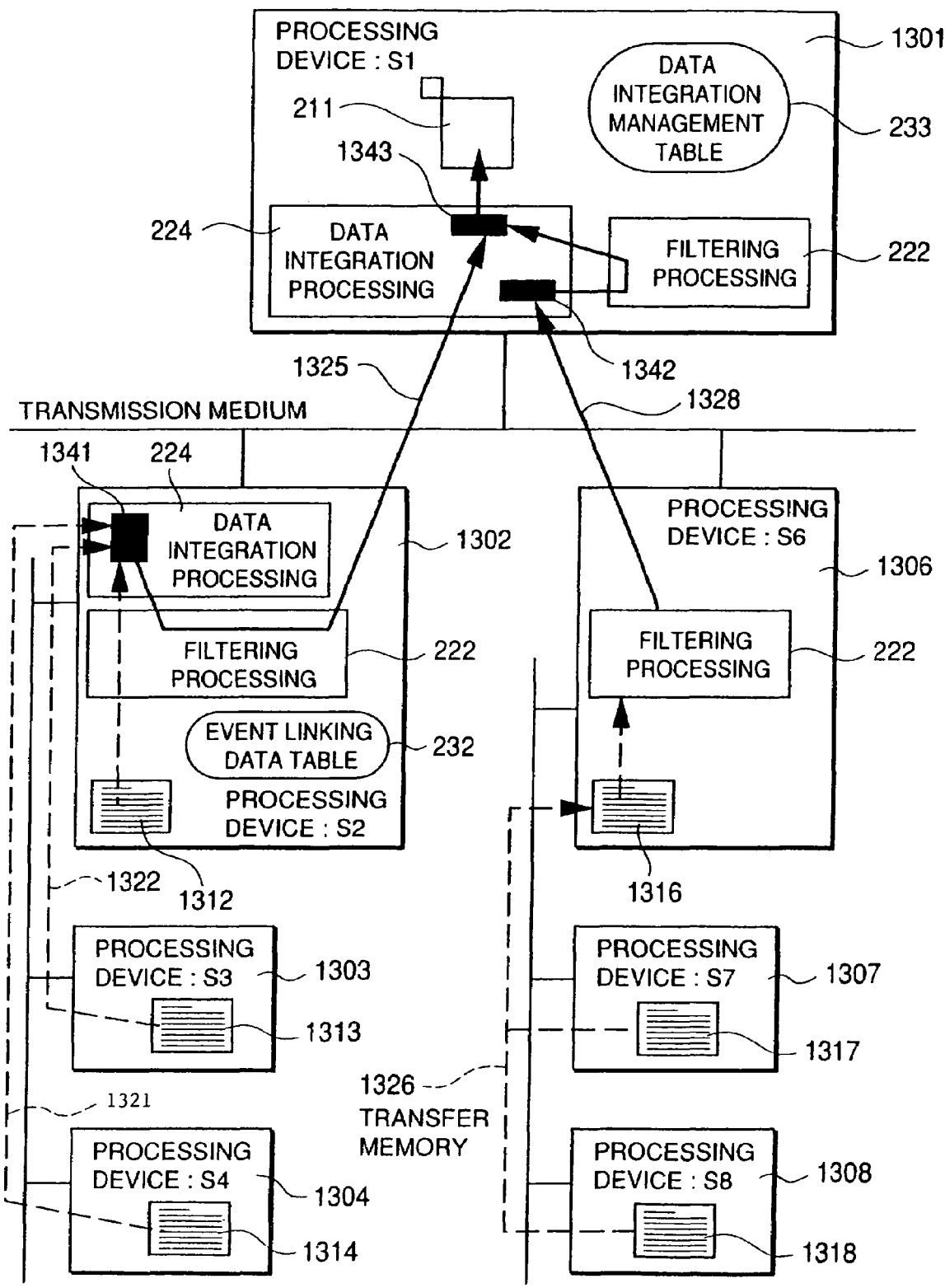
FIG. 16 is a diagram showing an application example when data integration processing is used in multi-stages.

FIG. 16 is a diagram showing an applied case where the data integration processing is used in multiple stages. This is the case where the application program 211 on the processing device 1301 (S1) collects the data of the processing devices 1302 (S2) to 1308 (S8). The data on the data table 1314 of the processing device S4 1304 and the data on the data table 1313 of the processing device S3 are transmitted to the processing device S2 1302 on the basis of the messages 1321, 1322 respectively, the value of the data item is also obtained from the data table 1312 of the processing device S2, and these data are integrated by the data integration processing 224 of the processing device S2. Reference numeral 1341 represents the basket obtained by integrating the collected data. The basket 1341 is transmitted to the filtering processing 222 of the processing device S2, and transmitted as a message 1325 to the processing device S1 which requests this basket. Further, the data on the data table 1317 of the processing device S7 and the data on the data table 1318 of the processing device S8 are periodically transferred to the data table 1316 of the processing device S6 1306 by a transfer memory 1326. The data are transmitted as a message 1328 through the filtering processing 222 of the processing device S6 1306 to the processing device S1, and collected as a basket 1342. The processing device S1 integrates the basket 1341 obtained from the processing device S2 on the basis of the message 1325 and the basket 1342 to prepare a basket 1343, and delivers the basket 1343 to the application program 211. The basket 1343 is prepared on the basis of the baskets 1341 and 1342, and the basket is used in multiple stages inside/outside the processing device. The data of the processing devices S3, S4 and S7, S8 to which the transmission medium is not directly linked may be directly obtained from the processing device S1 if the communication can be performed. However, by using the construction of the above embodiment, the baskets 1341 and 1342 may be collected on the basis of different events to integrate the data as a single basket on the basis of the basket 1343. Further, the information of the processing devices S2 to S4 is collected as a gate way by the processing device S2, thereby localizing the setting of the table integration management table 233 of the processing device S1.

FIG. 17A is a diagram showing a setting example of the data integration management table 233 held by the processing device S1. A record 1411 defines the basket 1343. No collection event is set in this record 1411. That is, as the constituent items, the basket only receives data transmitted from the self processing device or another processing device. The constituent item of the basket 1343 is defined by the records 1421 and 1422 of the collection item table. That is, the basket 1343 is an integration of the basket 1341 "N2 status" and the basket 1342 "N3 status". The source of the basket "N2 status" is a basket having the name "status basket" of the processing device S2, and the source of the basket "N3 status" is a basket "Net3 status" of the self processing device. The record 1412 defines the basket 1342, that is, the basket "Net3 status". The basket "Net3 status" comprises data to be collected when the data, table 1316 which is called "status table" of the processing device S6 is renewed. The constituent item of the basket "Net3 status" is defined by the record 1431 of the collection item table. That is, it is all the items, of the "status table" of the processing device S6. The type of the constituent item in the records 1421, 1422 and 1431 indicates "structure" which is an assembly of plural data items.

FIG. 17B is a diagram showing a setting example of the event linking data is table 232 which is held by the processing device S2. A record 1441 is set to transmit all the data items to the processing device S1 when the basket 1341 which is named "status basket of the self processing device is renewed. Here, "status basket is the basket 1341 obtained by integrating data which are collected on the basis of an event such as period, renewal or the like from the processing devices S2, S3 and S4, and the details of the constituent item are defined by the data integration management table 233 which is held by the processing device S2.

Figure 18:
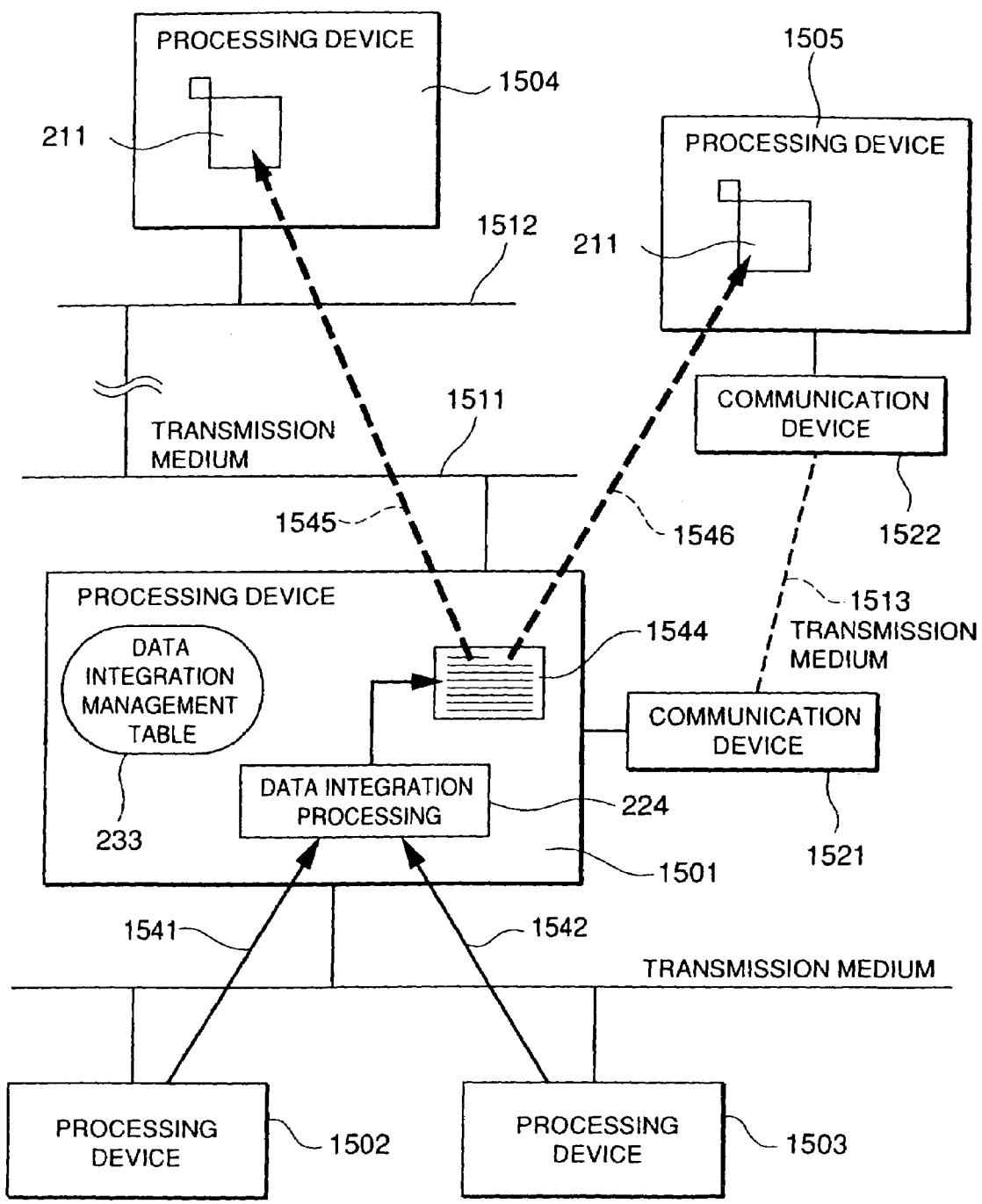
FIG. 18 is a diagram showing an example when integrated data are delivered when a program requests.

Some data collection modes and the applied cases where the processing device integrating the collected data immediately delivers baskets to the application program are described above. FIG. 18 is a diagram showing the system construction when the collected and integrated data are delivered at the time the program requests. A processing device 1501 collects and integrates data from a processing device 1502 and a processing device 1503. The integrated data are used by the application program 211 of the processing device 1504 or the application program 211 of a processing device 1505. Here, the processing device 1501 and the processing device 1504 are connected to transmission media respectively, and the transmission media 1511, 1512 are linked to each other through a processing device serving as a gate way or WAN. The processing device 1505 is linked to the transmission medium 1513 through a communication device 1522, and the processing device 1501 is linked to the transmission medium 1513 through the communication device 1521. This is applied to such cases where the transmission medium 1513 is a public telephone line, the communication devices 1521, 1522 are modems, the transmission medium 1513 is a radio LAN, the communication devices 1521, 1522 are radio LAN interfaces, etc. The processing device 1505 is a portable information terminal or the like. In this case, there is a case where the data integrated in the processing device 1501 cannot be immediately transmitted or a case where it is required that the data are not immediately received for some reason and the results which are afterwards collected as a single of unit are received. In such a case, the data are collected from the processing devices 1502 and 1503 on the basis of the messages 1541 and 1542 as described above and integrated, thereby retracting the integrated data as data 1544 from the buffer. At this time, the data integration management table 233 of the processing device 1501 indicates the demand type as the data reception/delivery method 373 of the collected basket. The retracted data are transmitted 1545 to the processing device 1504 at the convenience of the processing device 1504 or are transmitted 1546 to the processing device 1505 at the convenience of the processing device 1505, and used by the respective application programs 211 thereof.

As described above, according to the present invention, the data which are required by the application program are arranged and supplied to the application program when the application program needs the data. Therefore, the application is not required to be provided with code for inquiring about the data collection, and thus the development of programs can be facilitated. Further, it is unnecessary to correct the application program even when the storage medium and the data structure of the data source, the processing device storing the data and the transmission medium used for the data collection are renewed.

Further, the control is performed on the basis of the occurrence of an event which indicates the start or the end of the data collection, so that the data collection timing can be controlled more finely.

What is claimed is:

1. A distributed information integrating method for integrating information distributively stored in plural processing devices in a distributed information processing system in which the plural processing devices are connected to one another through transmission media and a series of processing operations are distributively performed, comprising the steps of:

collecting, by at least one first processing device, data stored in said first processing device according to a predetermined collecting condition in response to occurrence of an event serving as a trigger;

transmitting, by said first processing device, the collected data to said first processing device or a second processing device of an original data request side;

integrating, by said first processing device, the collected data received from said first processing device according to a predetermined integrating condition; and sending, by said first processing device, the integrated data to a request destination.

2. The integration method as claimed in claim 1, wherein said event is one of reception of a message having predetermined data, renewal of preset data which occurs in said first processing device, and timer interruption of a periodic timer which occurs in said first processing device.

3. The integration method as claimed in claim 1, wherein plural data collection processes are independently performed by plural first processing devices, and the data thus collected are used as one collection data for data integration which is performed by said first processing device.

4. A distributed information integrating apparatus for collecting and integrating information which is distributively stored in plural processing devices in a distributed information processing system in which the plural processing devices are connected to one another through transmission media and a series of processing operations are distributively performed, comprising:

first table means into which each processing device stores the name of data to be collected, which are stored therein, and a transmission destination of the collected data in association with a specific event;

first processing means for referring to said first table means in response to an event occurring for each processing device and a message event received through said transmission media to collect the data stored in the processing device and transmit the collected data to said transmission destination;

second table means for setting the items of data to be integrated while dividing the items for every data name of the collection data; and second processing means for receiving the collection data from said first processing means, integrating the collection data according to the setting of said second table means, and transmitting the integrated data to a request side therein.

5. The apparatus as claimed in claim 4, wherein said request side is said first processing means.

6. The apparatus as claimed in claim 4, wherein said event is one of reception of a message having predetermined data, renewal of preset data which occurs in said first processing device, and timer interruption of a periodic timer which occurs in said first processing device.

7. The apparatus as claimed in claim 4, wherein said second table means has an item for setting an AND/OR condition of plural collection data to be integrated, in the case where the AND condition is set in said item, said second processing means delivers all plural collection data to be integrated to said request side when all the plural collection data are arranged, and in the case where the OR condition is set, said second processing means delivers received collection data to said request side without waiting until all the collection data are arranged.

8. The apparatus as claimed in claim 4, wherein said second table means has an item for setting "event type" or "demand type" as a method of receiving/delivering the integrated plural collection data to said request side, in the case where the "demand type" is set as the reception/delivery method, said second processing means delivers the collection data to said request side when said request side transmits a data request, and in the case where the "event type" is set, said second processing means delivers the collection data to said request side irrespective of no request from said request side.

9. The apparatus as claimed in claim 4, wherein said second table means has an item from setting a limit time which is taken from the collection start time of plural collection data to be integrated until the collection end time of all the collection data, and said second processing means manages the limit time.

10. The apparatus as claimed in claim 4, wherein each of said first and second table means has an active-status item for setting validity/invalidity of each record thereof, and said apparatus further includes third table means for managing the occurrence frequency of a specific event to start or end the integration processing of the collection data, and third processing means for referring to/renewing said third table means and validating or invalidating the active status of each record of said first and second processing table means on the basis of the reference/renewal result.

\* \* \* \* \*